United States Patent
Cosoli et al.

(10) Patent No.: US 10,215,199 B2
(45) Date of Patent: Feb. 26, 2019

(54) TRAVEL AND WORK FUNCTIONS INTEGRATED INTO A HYDRAULIC HYBRID SYSTEM

(71) Applicant: DANA ITALIA SPA, Arco (IT)

(72) Inventors: Ettore Cosoli, Padua (IT); Giulio Ornella, Arco (IT); Lorenzo Serrao, Nago-Torbole (IT)

(73) Assignee: Dana Italia SPA, Arco (IT)

( * ) Notice: Subject to any disclaimer, the term of this patent is extended or adjusted under 35 U.S.C. 154(b) by 141 days.

(21) Appl. No.: 15/330,077

(22) PCT Filed: Feb. 3, 2015

(86) PCT No.: PCT/EP2015/052212
§ 371 (c)(1),
(2) Date: Aug. 3, 2016

(87) PCT Pub. No.: WO2015/117962
PCT Pub. Date: Aug. 13, 2015

(65) Prior Publication Data
US 2016/0377097 A1    Dec. 29, 2016

Related U.S. Application Data

(60) Provisional application No. 61/935,542, filed on Feb. 4, 2014.

(51) Int. Cl.
*F16D 31/02* (2006.01)
*F15B 11/17* (2006.01)
(Continued)

(52) U.S. Cl.
CPC ............... *F15B 11/17* (2013.01); *B60K 6/12* (2013.01); *F15B 1/02* (2013.01); *F15B 1/024* (2013.01);
(Continued)

(58) Field of Classification Search
CPC .. F16H 61/4078; F16H 61/4096; F15B 1/024; F15B 11/17
(Continued)

(56) References Cited

U.S. PATENT DOCUMENTS

| 4,760,697 A | 8/1988 | Heggie et al. |
| 4,815,334 A | 3/1989 | Lexen |

(Continued)

FOREIGN PATENT DOCUMENTS

| CN | 1394273 | 1/2003 |
| CN | 201176978 Y | 1/2009 |

(Continued)

OTHER PUBLICATIONS

European Patent Office, The International Search Report and Written Opinion in PCT/EP2015/052212, dated May 8, 2015, 10 pages. European Patent Office, Rijswijk, Netherlands.
(Continued)

*Primary Examiner* — Michael Leslie
(74) *Attorney, Agent, or Firm* — Marshall & Melhorn, LLC

(57) ABSTRACT

A series hydraulic hybrid system for a vehicle is described. The system has a hydraulic circuit, a hydraulic working assembly, and a hydraulic accumulator assembly. The hydraulic circuit has a first hydraulic displacement unit in fluid communication with a second hydraulic displacement unit. The first hydraulic displacement unit is drivingly engaged with a power source. The hydraulic working assembly has a hydraulic implement and a hydraulic working pump in fluid communication with the hydraulic implement, the hydraulic working pump drivingly engaged with the power source. The hydraulic accumulator assembly has a high pressure hydraulic accumulator and a low pressure hydraulic accumulator. The hydraulic accumulator assembly
(Continued)

selectively fluidly connects to the hydraulic circuit and the hydraulic accumulator assembly selectively fluidly connects to the hydraulic working assembly.

11 Claims, 12 Drawing Sheets

(51) Int. Cl.
| | |
|---|---|
| F15B 1/02 | (2006.01) |
| F16H 61/4096 | (2010.01) |
| F15B 21/14 | (2006.01) |
| F16H 61/4078 | (2010.01) |
| B60K 6/12 | (2006.01) |
| F15B 1/04 | (2006.01) |

(52) U.S. Cl.
CPC ............... *F15B 1/04* (2013.01); *F15B 21/14* (2013.01); *F16H 61/4078* (2013.01); *F16H 61/4096* (2013.01); *B60Y 2400/14* (2013.01); *F15B 2211/20507* (2013.01); *F15B 2211/20523* (2013.01); *F15B 2211/20561* (2013.01); *F15B 2211/20576* (2013.01); *F15B 2211/27* (2013.01); *F15B 2211/7058* (2013.01); *F15B 2211/7135* (2013.01); *F15B 2211/7142* (2013.01)

(58) Field of Classification Search
USPC .......................................................... 60/414
See application file for complete search history.

(56) References Cited

U.S. PATENT DOCUMENTS

| | | | |
|---|---|---|---|
| 5,518,461 | A | 5/1996 | Pfordt |
| 5,579,640 | A | 12/1996 | Gray, Jr. et al. |
| 5,887,674 | A | 3/1999 | Gray, Jr. |
| 6,622,484 | B2 | 9/2003 | Hopkins |
| 6,719,080 | B1 | 4/2004 | Gray, Jr. |
| 7,669,414 | B2 * | 3/2010 | Loeffler ............... B60K 6/12 60/414 |
| 7,870,727 | B2 | 1/2011 | Mueller et al. |
| 7,926,265 | B2 | 4/2011 | Mueller et al. |
| 7,934,779 | B2 | 5/2011 | Kodama |
| 7,984,783 | B2 | 7/2011 | Gray, Jr. et al. |
| 8,108,111 | B2 | 1/2012 | Stein et al. |
| 8,162,094 | B2 | 4/2012 | Gray, Jr. et al. |
| 8,616,323 | B1 | 12/2013 | Gurin |
| 8,959,905 | B2 | 2/2015 | Baltes et al. |
| 8,991,167 | B2 | 3/2015 | Yuan et al. |
| 9,032,723 | B2 | 5/2015 | Haugen |
| 9,057,389 | B2 * | 6/2015 | Opdenbosch ......... E02F 9/2296 |
| 9,096,115 | B2 * | 8/2015 | Ho ......................... F15B 21/14 |
| 9,765,502 | B2 * | 9/2017 | Heybroek ............... F15B 21/14 |
| 9,802,469 | B2 | 10/2017 | Ornella |
| 2004/0251067 | A1 | 12/2004 | Gray, Jr. et al. |
| 2006/0243515 | A1 | 11/2006 | Okada et al. |
| 2009/0165451 | A1 | 7/2009 | Mueller |
| 2011/0232418 | A1 | 9/2011 | Gray, Jr. et al. |
| 2011/0314801 | A1 | 12/2011 | Baltes et al. |
| 2012/0090308 | A1 | 4/2012 | Yuan et al. |
| 2012/0178570 | A1 | 7/2012 | Gray, Jr. et al. |
| 2012/0233991 | A1 | 9/2012 | Ivantysynova et al. |
| 2012/0240564 | A1 | 9/2012 | Wesolowski et al. |
| 2013/0081385 | A1 | 4/2013 | Opdenbosch |
| 2013/0133318 | A1 | 5/2013 | Vogl et al. |
| 2015/0113969 | A1 | 4/2015 | Kochhan et al. |
| 2016/0059694 | A1 | 3/2016 | Heren |
| 2016/0341309 | A1 | 11/2016 | Serrao |
| 2016/0361986 | A1 | 12/2016 | Ornella |
| 2017/0015197 | A1 | 1/2017 | Lambey |
| 2017/0067489 | A1 | 3/2017 | Versteyhe |
| 2017/0072778 | A1 | 3/2017 | Ornella |
| 2017/0305267 | A1 | 10/2017 | Ornella |
| 2017/0335867 | A1 | 11/2017 | Meehan |

FOREIGN PATENT DOCUMENTS

| | | |
|---|---|---|
| CN | 102518169 A | 6/2012 |
| CN | 102734237 A | 10/2012 |
| DE | 19931208 A1 | 1/2001 |
| DE | 102006017581 A1 | 9/2007 |
| DE | 102006060014 B4 | 5/2009 |
| DE | 102009056153 A1 | 6/2011 |
| DE | 102011005356 A1 | 9/2012 |
| DE | 102011055178 A1 | 5/2013 |
| EP | 0615077 A1 | 9/1994 |
| EP | 1963686 B1 | 10/2011 |
| FR | 2971741 A1 | 8/2012 |
| WO | 9634213 A1 | 10/1996 |
| WO | 9713650 A1 | 4/1997 |
| WO | 0151870 A1 | 7/2001 |
| WO | 2007035997 A1 | 4/2007 |
| WO | 2008012558 A2 | 1/2008 |
| WO | 2010072299 A1 | 7/2010 |
| WO | 2011112663 A2 | 9/2011 |
| WO | 2012125798 A1 | 9/2012 |
| WO | 2013121126 A1 | 8/2013 |
| WO | 2013159851 A1 | 10/2013 |

OTHER PUBLICATIONS

Machine-generated English Translation of DE19931208, obtained via Espacenet Patent Search.
Machine-generated English Translation of CN201176978, obtained via Espacenet Patent Search.
Machine-generated English Translation of CN102518169, obtained via Espacenet Patent Search.
Machine-generated English Translation of CN102734237, obtained via Espacenet Patent Search.
Chinese Office Action issued by the Chinese State Intellectual Property Office dated Sep. 20, 2017.
The State Intellectual Property Office of the People's Republic of China; Office Action issued in the parallel Chinese application No. CN201580006877.4; dated Apr. 21, 2017; 15 pages; The State Intellectual Property Office of the People's Republic of China, Beijing, Republic of China.

* cited by examiner

TRAVEL AND WORK FUNCTIONS INTEGRATED INTO A HYDRAULIC HYBRID SYSTEM

The present document claims priority from U.S. Provisional Patent Application No. 61/935,542 filed on Feb. 4, 2014, which is hereby incorporated by reference in its entirety.

The present invention primarily relates to a hydraulic hybrid transmission including hydraulic accumulators for hydraulic energy storage and a hydraulic working assembly and to various methods of operating the system. Hydraulic hybrid transmissions of this sort can typically be found in off-highway working machines used in agriculture, mining or construction, such as tractors, wheel loaders, wheeled excavators, backhoe loaders, telehandlers, dumpers, or the like.

BACKGROUND OF THE INVENTION

Closed circuit configurations and hydraulic pressures up to 420-450 bar are commonly used for hydrostatic travel functions in heavy-duty operating machines, while open circuit configurations and hydraulic pressures up to 250-300 bar are more common for work functions. Hence, the efficient and flexible operation of systems including both hydraulic travel functions and hydraulic work functions continues to pose a challenge to developers.

SUMMARY OF THE INVENTION

It is therefore an object of the present invention to design a hydraulic hybrid system comprising both hydraulic travel functions and hydraulic work functions that may be operated with a high degree of flexibility and efficiency.

This object is solved by a series hydraulic hybrid system according to claim 1. Special embodiments are described in the independent claims.

Thus, a series hydraulic hybrid system, in particular for use in an automotive vehicle is proposed, comprising:
- a hydraulic circuit comprising a first hydraulic displacement unit in fluid communication with a second hydraulic displacement unit, the first hydraulic displacement unit drivingly engaged or selectively drivingly engaged with a power source;
- a hydraulic working assembly comprising a hydraulic implement and a hydraulic working pump in fluid communication with the hydraulic implement, the hydraulic working pump drivingly engaged or selectively drivingly engaged with the power source; and
- a hydraulic accumulator assembly comprising a high pressure hydraulic accumulator and a low pressure hydraulic accumulator, the hydraulic accumulator assembly selectively fluidly connected to the hydraulic circuit and the hydraulic accumulator assembly selectively fluidly connected to the hydraulic working assembly.

In other words, the accumulator assembly may be selectively fluidly connected to both the hydraulic or hydrostatic circuit typically employed for travel functions and to the hydraulic working assembly typically employed for work functions. Energy from both the hydraulic circuit and the hydraulic working assembly may be recuperated and stored in the accumulator assembly. Furthermore, the energy stored in the accumulator assembly may be selectively directed to the hydraulic circuit or to the hydraulic working assembly for use in both travel and work functions. Thus, the proposed system guarantees a particularly energy-efficient and flexible operation.

Within the scope of this document the formulation "in fluid communication with" may include one of "fluidly connected to" and "selectively fluidly connected to", for example through one or more valves.

Typically, the first hydraulic displacement unit includes or is configured as a hydraulic or hydrostatic pump. For example, the first hydraulic displacement unit may include a hydrostatic axial piston pump or a hydrostatic radial piston pump. The first hydraulic displacement unit may have a variable hydraulic displacement. For example, the first hydraulic displacement unit may have a moveable swashplate. The second hydraulic displacement unit may include or may be configured as a hydraulic or hydrostatic motor. For example, the second hydraulic displacement unit may include a hydrostatic axial piston motor or a hydrostatic radial piston motor. The second hydraulic displacement unit may have a variable hydraulic displacement. For example, the second hydraulic displacement unit may have a moveable swashplate. The power source may include an engine, such as an internal combustion engine or an electric engine. Usually, the second hydraulic displacement unit is drivingly engaged or selectively drivingly engaged with a vehicle output. The vehicle output may include at least one of a driveshaft, a final drive, a vehicle axle and one or more wheels, for example.

The hydraulic circuit typically comprises a first main fluid line and a second main fluid line, the first hydraulic displacement unit and the second hydraulic displacement unit being in fluid communication with each other through the first main fluid line and the second main fluid line. For example, the first main fluid line may fluidly connect or selectively fluidly connect a first fluid port of the first hydraulic displacement unit to a first fluid port of the second hydraulic displacement unit. Similarly, the second main fluid line may fluidly connect or selectively fluidly connect a second fluid port of the first hydraulic displacement unit to a second fluid port of the second hydraulic displacement unit. That is, the hydraulic circuit may be configured as a closed hydraulic or hydrostatic circuit formed or selectively formed by the first and the second hydraulic displacement unit and by the first and the second main fluid line. Usually, the hydraulic circuit is fluidly sealed from the external environment. For example, a minimum hydraulic pressure within the hydraulic circuit may be at least 10 bar or at least 20 bar.

The hydraulic implement may be any implement adapted to convert hydraulic pressure or hydraulic flow to a mechanical force or to a mechanical movement, for example a linear movement or a rotational movement. For example, the hydraulic implement may include one or more hydraulic pistons and/or one or more hydraulic motors. The hydraulic implement may be part of a lifting device, a buckling device, a winching device or the like. The hydraulic working pump may include a hydrostatic pump such as a hydrostatic axial piston pump or a hydrostatic radial piston pump, for example. The hydraulic working assembly may further include a fluid reservoir in fluid communication with the working pump and with the hydraulic implement. For example, the working pump may be adapted to displace hydraulic fluid from the reservoir to the implement or vice versa for driving the implement. The hydraulic working assembly may further include one or more valves for selectively directing a flow of fluid between the working pump and the implement and/or for selectively fluidly disconnecting the working pump from the implement.

The accumulators may be configured as compressed gas accumulators. An accumulator may be pressurized by filling or by partially filling the corresponding accumulator with a hydraulic fluid such as oil, thereby compressing a quantity of gas contained in the accumulator. The gas may be an inert gas such as nitrogen. Similarly, an accumulator may be de-pressurized by letting a compressed gas contained in the accumulator expand, thereby pushing hydraulic fluid contained in the accumulator out of the accumulator and creating a fluid flow. The accumulators may be adapted to operate at hydrostatic pressures up to a maximum operating pressure of at least 300 bar or of at least 400 bar, for example.

The system may comprise at least one first high pressure accumulator valve for selectively fluidly connecting the high pressure accumulator to the hydraulic circuit. The first high pressure accumulator valve may have at least three positions or configurations and may be adapted to be selectively switched between these positions or configurations. In the first position or configuration, the first high pressure accumulator valve may fluidly disconnect the high pressure accumulator from the hydraulic circuit. In the second position or configuration, the first high pressure accumulator valve may fluidly connect the high pressure accumulator to the first main fluid line while fluidly disconnecting the high pressure accumulator from the second main fluid line. In the third position or configuration, the first high pressure accumulator valve may fluidly connect the high pressure accumulator to the second main fluid line while fluidly disconnecting the high pressure accumulator from the first main fluid line.

The system may further comprise a second high pressure accumulator valve for selectively fluidly connecting/disconnecting the high pressure accumulator to/from the hydraulic working assembly. The second high pressure accumulator valve may be part of or integrated in the at least one first high pressure accumulator valve. Alternatively, the first and the second high pressure accumulator valves may be configured as separate valves. Typically, the high pressure accumulator valves are adapted to fluidly disconnect the high pressure accumulator from the hydraulic working assembly while the high pressure accumulator is fluidly connected to the hydraulic circuit, and to fluidly disconnect the high pressure accumulator from the hydraulic circuit while the high pressure accumulator is fluidly connected to the hydraulic working assembly.

Similarly, the system may comprise at least one low pressure accumulator valve for selectively fluidly connecting the low pressure accumulator to the hydraulic circuit. The low pressure accumulator valve may have at least three positions or configurations and may be adapted to be selectively switched between these positions or configurations. In the first position or configuration, the low pressure accumulator valve may fluidly disconnect the low pressure accumulator from the hydraulic circuit. In the second position or configuration, the low pressure accumulator valve may fluidly connect the low pressure accumulator to the first main fluid line while fluidly disconnecting the low pressure accumulator from the second main fluid line. In the third position or configuration, the low pressure accumulator valve may fluidly connect the low pressure accumulator to the second main fluid line while fluidly disconnecting the low pressure accumulator from the first main fluid line.

The system may further comprise a second low pressure accumulator valve for selectively fluidly connecting/disconnecting the low pressure accumulator to/from the hydraulic working assembly. The second low pressure accumulator valve may be part of or integrated in the at least one first low pressure accumulator valve. Alternatively, the first and the second low pressure accumulator valves may be configured as separate valves. Typically, the low pressure accumulator valves are adapted to fluidly disconnect the low pressure accumulator from the hydraulic working assembly while the low pressure accumulator is fluidly connected to the hydraulic circuit, and to fluidly disconnect the low pressure accumulator from the hydraulic circuit while the low pressure accumulator is fluidly connected to the hydraulic working assembly.

The high pressure accumulator and the hydraulic working assembly, in particular the high pressure accumulator and the working pump, may be fluidly connected or fluidly connectable to each other in such a way that, when they are fluidly connected, the working pump may displace hydraulic fluid from the hydraulic working assembly to the high pressure accumulator for pressurizing the high pressure accumulator. Typically, the working pump may pressurize the high pressure accumulator at least up to a maximum tolerable pressure of the hydraulic working assembly. This allows pressurizing or charging the high pressure accumulator while the system is operated in a hydrostatic mode, for example. In the hydrostatic mode energy from the power source is transmitted to the vehicle output through the hydraulic circuit.

The high pressure accumulator and the hydraulic working assembly, and in particular the high pressure accumulator and the hydraulic implement, may be fluidly connected or fluidly connectable to each other in such a way that, when they are fluidly connected and when the high pressure accumulator is pressurized, hydraulic fluid may be displaced from the high pressure accumulator to the hydraulic implement for driving the hydraulic implement. This allows driving the hydraulic implement when the power source is not running to drive the working pump, for example. However, in this configuration the hydraulic pressure in the high pressure accumulator should not be above the maximum tolerable pressure of the hydraulic working assembly. To overcome this limitation, the high pressure accumulator and the hydraulic working assembly may be in fluid communication through a pressure reducing valve. This pressure reducing valve may be configured to limit a hydraulic pressure applied from the high pressure accumulator to the hydraulic working assembly to the maximum tolerable pressure of the hydraulic working assembly.

Analogously, the low pressure accumulator and the hydraulic working assembly, in particular the low pressure accumulator and the working pump, may be fluidly connected or fluidly connectable to each other in such a way that, when they are fluidly connected, the working pump may displace hydraulic fluid from the hydraulic working assembly to the low pressure accumulator for pressurizing the low pressure accumulator. Typically, the working pump may pressurize the low pressure accumulator at least up to the maximum tolerable pressure of the hydraulic working assembly. This allows pressurizing or charging the low pressure accumulator while the system is operated in the hydrostatic mode, for example.

The low pressure accumulator and the hydraulic working assembly, in particular the low pressure accumulator and the hydraulic implement, may be fluidly connected or fluidly connectable to each other in such a way that, when they are fluidly connected and when the low pressure accumulator is pressurized, hydraulic fluid may be displaced from the low pressure accumulator to the hydraulic implement for driving the hydraulic implement. This allows driving the hydraulic implement when the power source is not running to drive the working pump, for example.

The hydraulic working assembly, in particular the working pump, may be fluidly connectable to the hydraulic circuit in such a way that, when they are fluidly connected, the hydraulic working pump may displace hydraulic fluid from the hydraulic working assembly to the hydraulic circuit. This may be useful for pressurizing the high pressure accumulator up to a hydraulic pressure above the maximum tolerable pressure of the hydraulic working assembly, for example. To that end, the hydraulic working assembly may be fluidly connected to the hydraulic circuit, for example to the first fluid port of the first hydraulic displacement unit, and the high pressure hydraulic accumulator may likewise be fluidly connected to the hydraulic circuit, for example to the second fluid port of the first hydraulic displacement unit. Then, the power source may drive the first hydraulic displacement unit (and possibly additionally the working pump) to displace hydraulic fluid from the hydraulic working assembly (for example from a fluid reservoir of the hydraulic working assembly) through the first hydraulic displacement unit to the high pressure accumulator. In this configuration the hydraulic working assembly should be fluidly connected to the low pressure port of the first hydraulic displacement unit while the high pressure accumulator should be fluidly connected to the high pressure port of the first hydraulic displacement unit.

Furthermore, during the above described charging or discharging of the high pressure accumulator through the hydraulic circuit it may be advantageous to fluidly disconnect the second hydraulic displacement unit (and the vehicle output, if applicable) from the hydraulic circuit. To that end the hydraulic circuit may comprise a pair of isolation valves adapted to selectively fluidly disconnect the second hydraulic displacement unit from the accumulator assembly, in particular when the accumulator assembly is fluidly connected to the hydraulic circuit, and adapted to selectively fluidly disconnect the second hydraulic displacement unit from the first hydraulic displacement unit. These isolation valves may be simple shut-off valves (2/2-way valves) having an open position and a closed position, for example.

The hydraulic circuit may further comprise another pair of isolation valves adapted to selectively fluidly disconnect the first hydraulic displacement unit from the accumulator assembly, in particular when the accumulator assembly is fluidly connected to the hydraulic circuit, and adapted to fluidly disconnect the first hydraulic displacement unit from the second hydraulic displacement unit. Like the isolation valves associated with the second hydraulic displacement unit, the isolation valves associated with the first hydraulic displacement unit may be configured as shut-off valves.

Fluidly disconnecting the first hydraulic displacement unit from the accumulator assembly and from the second hydraulic displacement unit may be useful during regenerative braking, for example. During regenerative braking the accumulator assembly is fluidly connected to the hydraulic circuit and the second hydraulic displacement unit absorbs kinetic energy from the vehicle output to displace hydraulic fluid from the low pressure accumulator to the high pressure accumulator, thereby increasing a pressure gradient between the low pressure accumulator and the high pressure accumulator.

Fluidly disconnecting the first hydraulic displacement unit from the accumulator assembly and from the second hydraulic displacement unit may furthermore be useful when the accumulator assembly is fluidly connected to the hydraulic circuit to drive the vehicle output through the second hydraulic displacement unit, typically by displacing hydraulic fluid from the high pressure accumulator to the low pressure accumulator through the second hydraulic displacement unit.

The hydraulic circuit may further comprise a bypass valve adapted to selectively fluidly connect the first main fluid line to the second main fluid line. Directly fluidly connecting the first and the second main fluid line through the bypass valve may prevent cavitation in the first/second hydraulic displacement unit when fluidly disconnecting the first/second hydraulic displacement unit using the above described isolation valves.

The system may further comprise a mechanical splitter box adapted to selectively drivingly engage a transmission shaft of the first hydraulic displacement unit with a transmission shaft of the hydraulic working pump, such that, when the hydraulic accumulator assembly is charged, the hydraulic accumulator assembly is adapted to selectively drive the hydraulic working pump through the first hydraulic displacement unit by displacing hydraulic fluid from the high pressure accumulator to the low pressure accumulator through the first hydraulic displacement unit. The splitter box may further be adapted to disengage the power source from the working pump and from the first hydraulic displacement unit while drivingly engaging the working pump with the first hydraulic displacement unit as described above.

The system may further comprise an electronic control unit configured to control the above described valves of the system and the power source through electronic or electromagnetic signals. The control unit may be configured to control the valves of the system and the power source according to at least one of the modes of operation described above.

Furthermore, various methods of operating the above described series hydraulic hybrid system are proposed.

One method of operating the series hydraulic hybrid system comprises the steps of:
  fluidly connecting the high pressure hydraulic accumulator to the hydraulic working pump, and
  driving the hydraulic working pump to displace hydraulic fluid from the hydraulic working assembly to the high pressure hydraulic accumulator for pressurizing the high pressure hydraulic accumulator.

Another method of operating the series hydraulic hybrid system comprises the steps of:
  fluidly connecting the high pressure hydraulic accumulator to the hydraulic implement, and
  displacing hydraulic fluid from the high pressure hydraulic accumulator to the hydraulic implement for driving the hydraulic implement.

Another method of operating the series hydraulic hybrid system comprises the steps of:
  fluidly connecting the low pressure hydraulic accumulator to the hydraulic working pump, and
  driving the hydraulic working pump to displace hydraulic fluid from the hydraulic working assembly to the low pressure hydraulic accumulator for pressurizing the low pressure hydraulic accumulator.

Another method of operating the series hydraulic hybrid system comprises the steps of:
  fluidly connecting the low pressure hydraulic accumulator to the hydraulic implement, and displacing hydraulic fluid from the low pressure hydraulic accumulator to the hydraulic implement for driving the hydraulic implement.

Another method of operating the series hydraulic hybrid system comprises the steps of:
fluidly connecting the hydraulic working pump to a first fluid port of the first hydraulic displacement unit,
fluidly connecting a second fluid port of the first hydraulic displacement unit to the high pressure hydraulic accumulator, and
driving the working pump and the first hydraulic displacement unit to displace hydraulic fluid from the hydraulic working assembly to the high pressure hydraulic accumulator for pressurizing the high pressure hydraulic accumulator.

Another method of operating the series hydraulic hybrid system comprises the steps of:
fluidly connecting the hydraulic accumulator assembly to the first hydraulic displacement unit;
drivingly engaging the first hydraulic displacement unit with the hydraulic working pump; and
displacing hydraulic fluid from the high pressure hydraulic accumulator to the low pressure hydraulic accumulator through the first hydraulic displacement unit to drive the hydraulic working pump through the first hydraulic displacement unit.

BRIEF DESCRIPTION OF THE DRAWINGS

A preferred embodiment of the presently proposed system is described in the following detailed description and is depicted in the accompanying drawing in which.

DETAILED DESCRIPTION OF THE INVENTION

Figure 1:
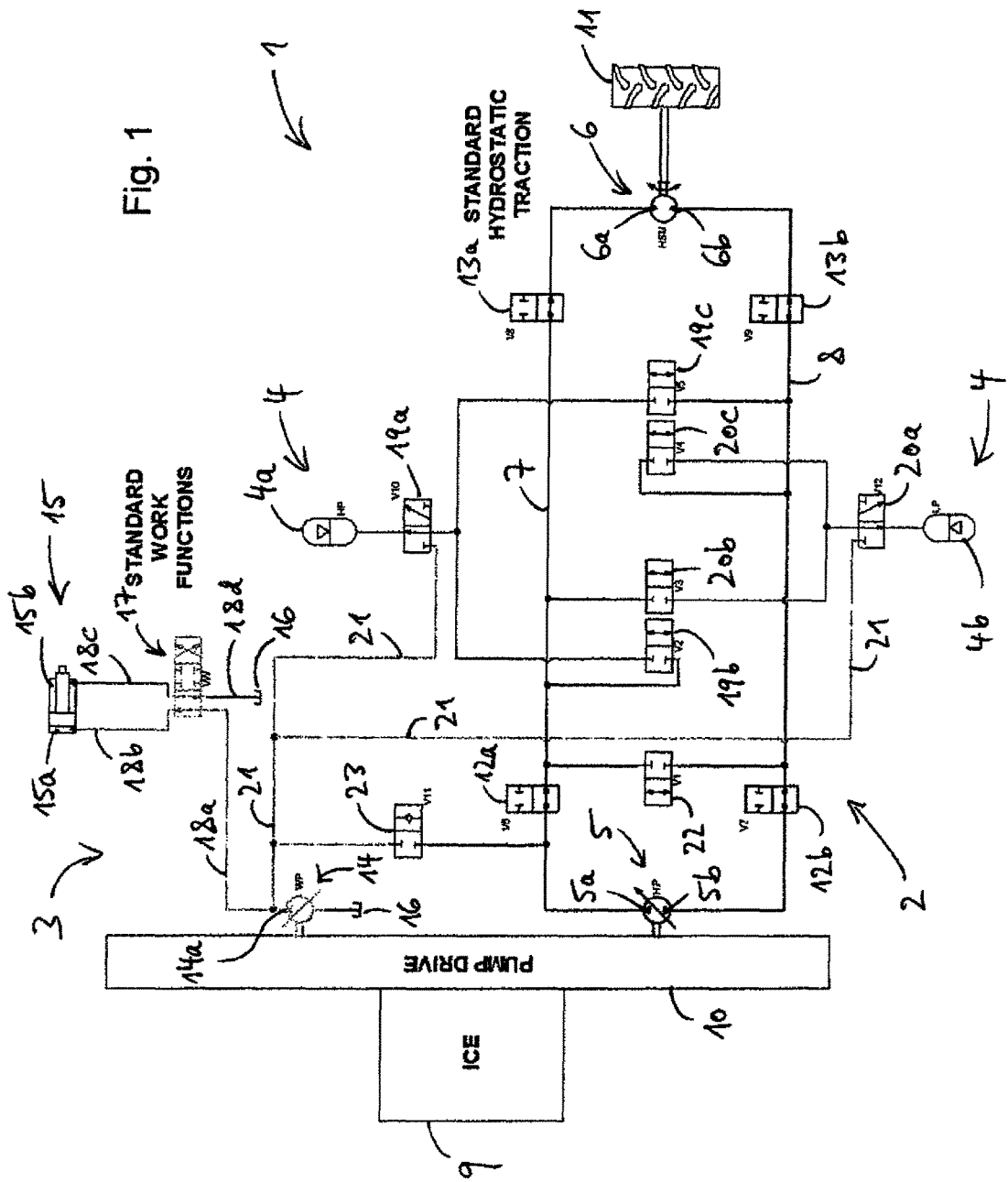
FIG. 1 shows an embodiment of the presently proposed series hydraulic hybrid system, wherein a hydraulic implement of a hydraulic working assembly is driven by a working pump and wherein a vehicle output is driven by an internal combustion engine through a hydrostatic transmission (mode 0)

FIG. 1 shows an embodiment of a series hydraulic hybrid system 1. The system 1 may be arranged in an off-highway vehicle such as a wheel loader. The system 1 includes a hydraulic circuit 2, a hydraulic working assembly 3, and a hydraulic accumulator assembly 4.

The hydraulic circuit 2 comprises a hydrostatic pump 5 in fluid communication with a hydrostatic motor 6 through a first main fluid line 7 and through a second main fluid line 8. The hydrostatic pump 5 is drivingly engaged or selectively drivingly engaged with an internal combustion engine 9 through a mechanical splitter box 10. The hydrostatic motor 6 is drivingly engaged or selectively drivingly engaged with a vehicle output 11. The vehicle output 11 may comprise a drive shaft, a final drive, a vehicle axle, and one or more wheels, for example.

The first main fluid line 7 selectively fluidly connects a first fluid port 5a of the pump 5 to a first fluid port 6a of the motor 6 through isolation valves 12a, 13a. The second main fluid line 8 selectively fluidly connects a second fluid port 5b of the pump 5 to a second fluid port 6b of the motor 6 through isolation valves 12b, 13b. The isolation valves 12a, 12b, 13a, 13b are configured as 2/2-way shut-off valves having an open position and a closed position. When switched to the open position, hydraulic fluid may flow through the shut-off valve. When switched to the closed position, a flow of hydraulic fluid through the shut-off valve is blocked. When the isolation valves 12a, 12b, 13a, 13b are each switched to the open position (as shown in FIG. 1), the pump 5, the motor 6, the first main fluid line 7, and the second main fluid line 8 form a closed hydrostatic circuit.

The hydraulic circuit 2 further includes a bypass valve 22 which selectively fluidly connects the first main fluid line 7 to a second main fluid line 8. The bypass valve 22 is configured as a 2/2-way shut-off valve having an open position and a closed position. The bypass valve 22 is usually in the closed position, as shown in FIG. 1. The bypass valve 22 can be opened when the pump 5 is fluidly disconnected from the motor 6 and from the accumulator assembly 4 by closing the isolation valves 12a, 12b, or when the motor 6 is fluidly disconnected from the motor 5 and from the accumulator assembly 4 by closing the isolation valves 13a, 13b. When disconnecting the pump 5 or the motor 6, opening the bypass valve 22 may prevent cavitation in the hydraulic circuit 2.

The hydraulic working assembly 3 includes a hydraulic working pump 14, a hydraulic implement 15, a fluid reservoir 16, a 4/3-way control valve 17, and fluid lines 18a-d. The working pump 14 is drivingly engaged or selectively drivingly engaged with the engine 9 through the splitter box 10. The working pump 14, the implement 15, and the reservoir 16 are in fluid communication with each other through the control valve 17 and the fluid lines 18a-d. The implement 15 comprises a hydraulic piston movably arranged in a hydraulic cylinder. The piston may be moved by changing an amount of hydraulic fluid in the cylinder on opposing sides 15a, 15b of the piston.

The control valve 17 has four fluid ports and three control positions. When switched to a first (neutral) control position (the center position in FIG. 1), the control valve 17 fluidly disconnects the implement 15 from the reservoir 16 and from the working pump 14 (and from the hydraulic circuit 2 and the accumulators 4a, 4b if the corresponding valves 23, 19a, 19b are in their respective second control position). When the valve 17 is switched to the second control position, as shown in FIG. 1, the valve 17 fluidly connects the fluid line 18a to the first side 15a of the hydraulic piston of the implement 15 through the fluid line 18b and fluidly connects the reservoir 16 to the second side 15b of the hydraulic piston of the implement 15 through the fluid line 18c. When the valve 17 is switched to the third control position (the right most position in FIG. 1), the valve 17 fluidly connects the fluid line 18a to the second side 15b of the hydraulic piston of the implement 15 through the fluid line 18c and fluidly connects the reservoir 16 to the first side 15a of the hydraulic piston of the implement 15 through the fluid line 18b.

That is, when the fluid line 18a is pressurized, the hydraulic piston of the implement 15 may be driven in a first direction (to the right in FIG. 1) by switching the control valve 17 to the second control position (as shown in FIG. 1) and the hydraulic piston of the implement 15 may be driven in a second direction opposed to the first direction by switching the control valve 17 to the third control position. The fluid line 18a may be pressurized by driving the working pump 14 or by fluidly connecting the fluid line 18a to one of the accumulators 4a, 4b and the hydraulic circuit 2 (provided the latter are pressurized).

The accumulator assembly 4 includes a high pressure bladder accumulator 4a, a low pressure bladder accumulator 4b, high pressure accumulator valves 19a-c and low pressure accumulator valves 20a-c. The valves 19b, 19c, 20b, 20c are configured as 2/2-way shut-off valves having an open position and a closed position. The valves 19a, 20a are configured as 3/2-way valves.

The valve 19a can be selectively switched to a first control position (shown in FIG. 1) and to a second control position. When the valve 19a is switched to the first control position, as shown in FIG. 1, the high pressure accumulator is fluidly disconnected from the working assembly 3 and is in fluid communication with the hydraulic circuit 2 through the valves 19b, 19c. Specifically, the high pressure accumulator 4a may be fluidly connected to the first main fluid line 7 by switching the valve 19a to the first control position and by opening the valve 19b. The high pressure accumulator 4a may be fluidly disconnected from the first main fluid line 7 by closing the valve 19b. The high pressure accumulator 4a may be fluidly connected to the second main fluid line 8 by switching the valve 19a to the first control position and by opening the valve 19c. The high pressure accumulator 4a may be fluidly disconnected from the second main fluid line 8 by closing the valve 19c.

Figure 5:
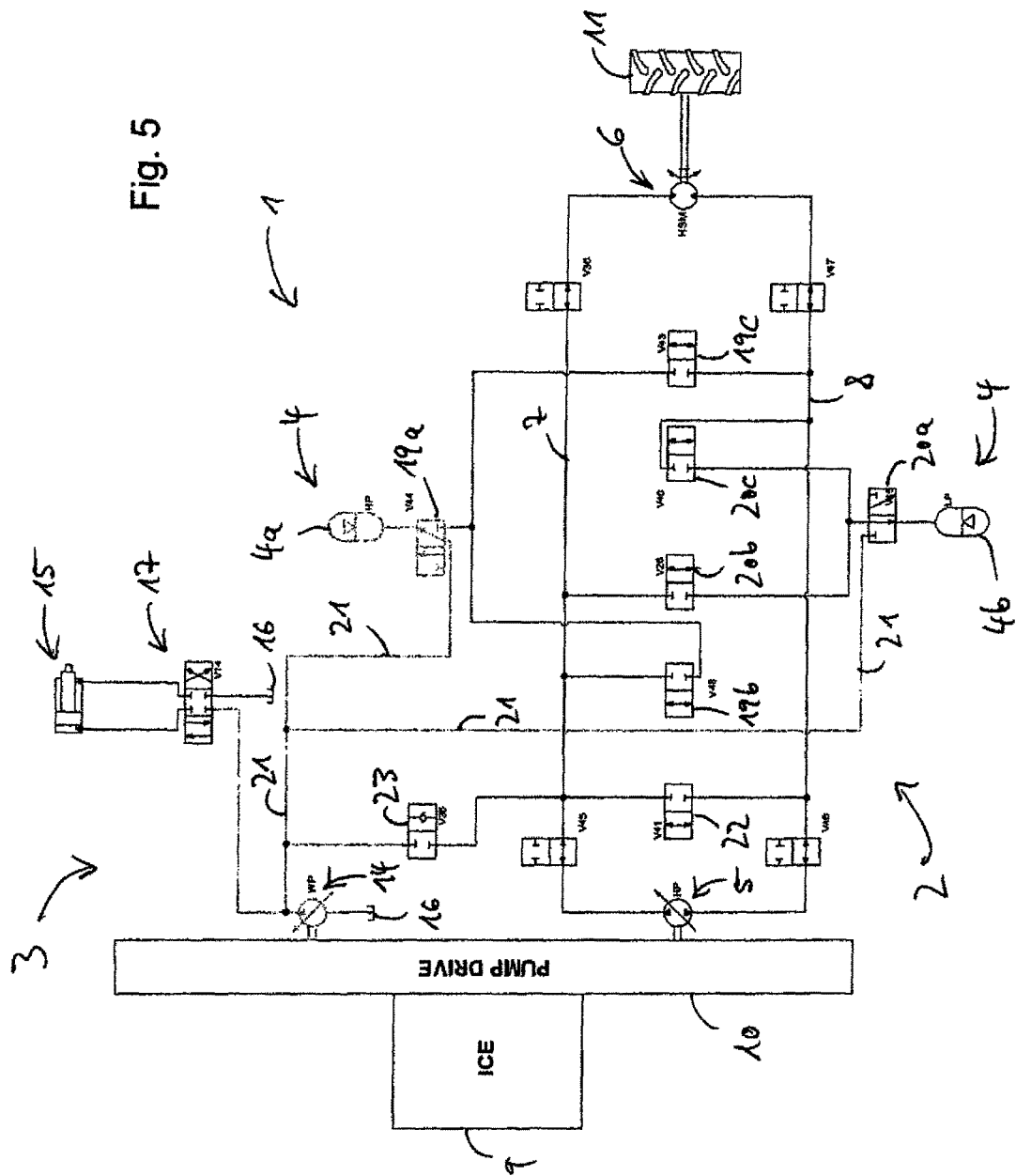
FIG. 5 shows the series hybrid system of FIG. 1, wherein the engine drives the working pump to pressurize the high pressure accumulator (mode 4)

When the valve 19a is switched to the second control position (as shown in FIG. 5, for example), the high pressure accumulator 4a is fluidly connected to the working assembly 3 through a fluid line 21 and fluidly disconnected from the hydraulic circuit 2. The fluid line 21 is fluidly connected to a first fluid port 14a of the working pump 14. Furthermore, when the valve 19a is switched to the second control position, the high pressure accumulator 4a is in fluid communication with the implement 15 through the control valve 17.

The valve 20a can be selectively switched to a first control position (shown in FIG. 1) and to a second control position. When the valve 20a is switched to the first control position, as shown in FIG. 1, the low pressure accumulator is fluidly disconnected from the working assembly 3 and is in fluid communication with the hydraulic circuit 2 through the valves 20b, 20c. Specifically, the low pressure accumulator 4b may be fluidly connected to the first main fluid line 7 by switching the valve 20a to the first control position and by opening the valve 20b. The low pressure accumulator 4b may be fluidly disconnected from the first main fluid line 7 by closing the valve 20b. The low pressure accumulator 4b may be fluidly connected to the second main fluid line 8 by switching the valve 20a to the first control position and by opening the valve 20c. The low pressure accumulator 4b may be fluidly disconnected from the second main fluid line 8 by closing the valve 20c.

Figure 7:
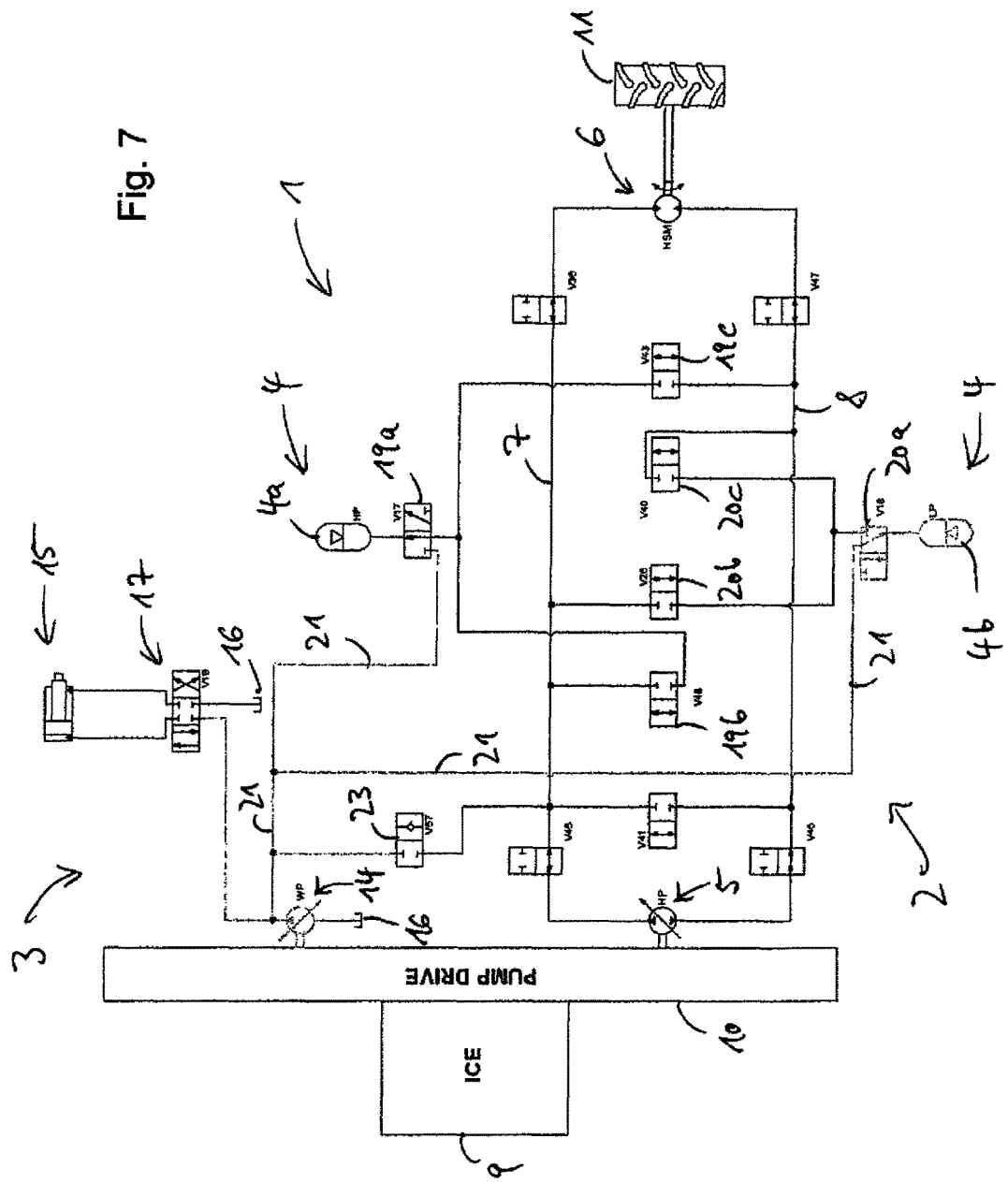
FIG. 7 shows the series hybrid system of FIG. 1, wherein the engine drives the working pump to pressurize a low pressure accumulator of the accumulator assembly (mode 6)

When the valve 20a is switched to the second control position (as shown in FIG. 7, for example), the low pressure accumulator 4b is fluidly connected to the working assembly 3 through the fluid line 21 and fluidly disconnected from the hydraulic circuit 2. Furthermore, when the valve 20a is switched to the second control position, the low pressure accumulator 4b is in fluid communication with the implement 15 through the control valve 17.

The series hydraulic hybrid system 1 further includes a 2/2-way valve 23 having an open and a closed position. The valve 23 is adapted to selectively fluidly connect the hydraulic circuit 2 to the working assembly 3. The valve 23 has a first and a second control position. When the valve 23 is switched to the first control position, as shown in FIG. 1, the valve 23 fluidly disconnects the hydraulic circuit 2 from the working assembly 3. When the valve 23 is switched to the second control position, the valve 23 fluidly connects the first main fluid line 7 to the first fluid port 14a of the working pump 14. Further, when the valve 23 is switched to the second control position, the valve 23 provides fluid communication between the hydraulic circuit 2, in particular the first main fluid line 7, and the implement 15 through the control valve 17.

Additionally, the series hydraulic hybrid system 1 includes an electronic control unit (not shown). The control unit is configured to control the engine 9 and the splitter box 10 to drive the pump 5 and/or the working pump 14 and to independently control the position of the valves 12a, 12b, 13a, 13b, 22, 19a-c, 20a-c, 23, and 17.

In FIG. 1 the control unit controls the valves 19a, 19b, 23 to operate the working assembly 3 in a standard work function mode. This includes switching the valves 19a, 19b, 23 to their respective first control position to fluidly disconnect the accumulators 4a, 4b and the hydraulic circuit 2 from the working assembly 3. The standard work function mode may include driving the working pump 14 through the engine 9 to move the hydraulic piston of the implement 15 as explained above. In the standard work function mode a hydraulic pressure in the working assembly may be at a standard work function pressure of between 250 bar and 270 bar, for example.

Further in FIG. 1, the control unit controls the engine 9, the splitter box 10 and the valves 12a-b, 13a-b, 19a-c, 20a-c, 22, 23 to operate the hydraulic circuit 2 in a standard hydrostatic mode. This includes opening the valves 12*a-b*, 13*a-b* to close the hydraulic circuit 2, closing the valves 22, 23 and controlling the valves 19*a-c*, 20*a-c* such as to fluidly disconnect the accumulators 4*a*, 4*b* from the hydraulic circuit (all as shown in FIG. 1). The standard hydrostatic mode may further in include driving the hydrostatic motor through the engine 9 and the hydraulic circuit 2. The hydraulic pressure in one of the main fluid lines of the hydraulic circuit 2 may then be at a high traction pressure of between 420 bar and 450 bar and a hydraulic pressure in the other of the main fluid lines of the hydraulic circuit 2 may then be at a low traction pressure of between 20 bar and 30 bar, for example.

Operating the working assembly 3 in the standard work function mode and the hydraulic circuit 2 in the standard hydrostatic mode as shown in FIG. 1 is termed mode 0 in the following.

Figure 2:
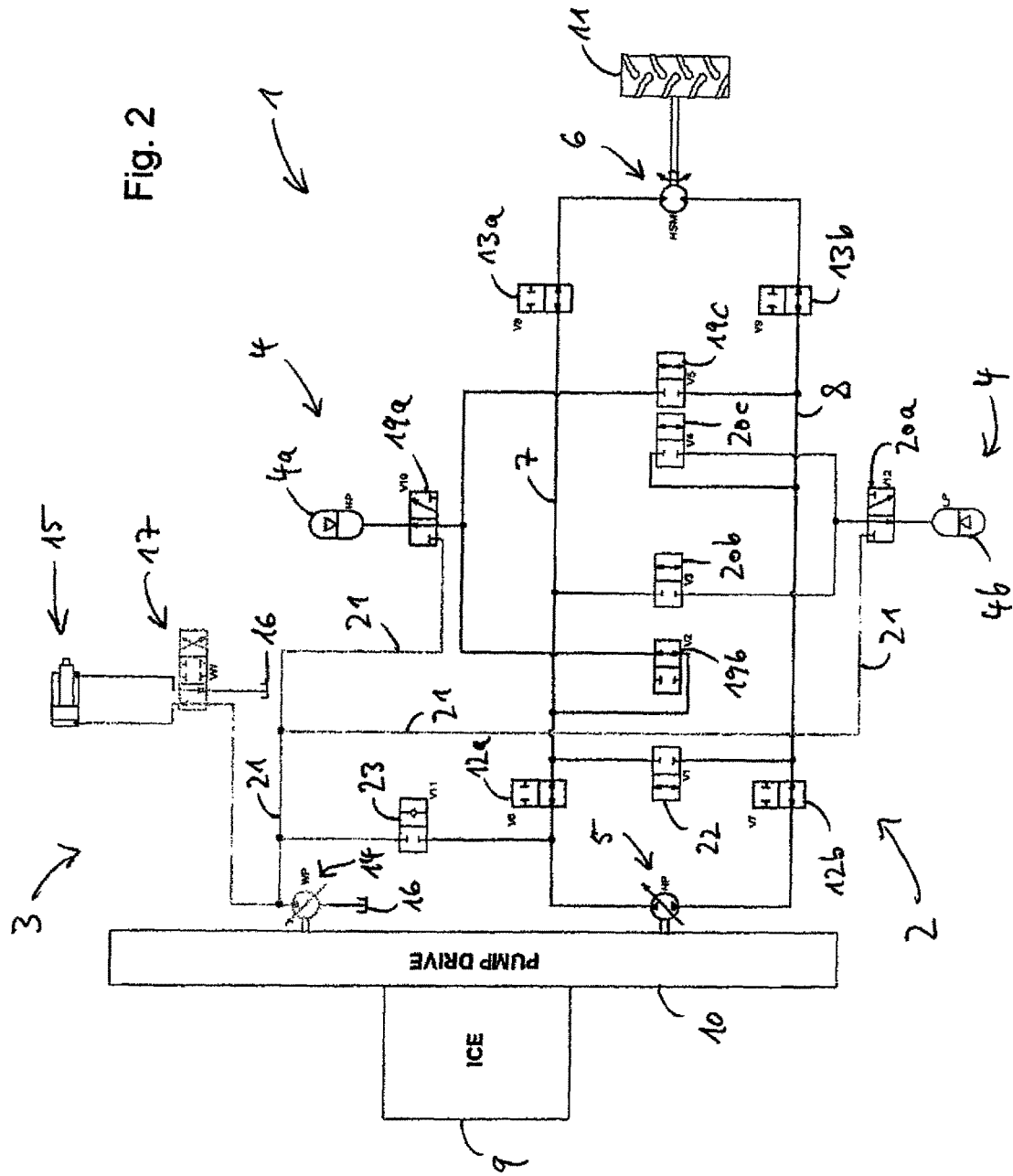
FIG. 2 shows the series hybrid system of FIG. 1, wherein an engine drives a hydrostatic pump to charge a high pressure hydraulic accumulator of an accumulator assembly (mode 1)

FIG. 2 shows the series hydraulic hybrid system of FIG. 1 in another mode of operation (mode 1). Here and in the following, recurring features are designated by the same reference signs. Mode 1 relates to pressurizing the high pressure accumulator 4*a* using a closed-circuit replenishing pump (not shown). In mode 1, the control unit controls the high pressure accumulator valves 19*a-c* to disconnect the high pressure accumulator 4*a* from the working assembly 3, to fluidly connect the high pressure accumulator 4*a* to the first main fluid line 7 and to fluidly disconnect the high pressure accumulator 4*a* from the second main fluid line 8.

Further in mode 1, the control unit controls the low pressure accumulator valves 20*a-c* to disconnect the low pressure accumulator 4*b* from the working assembly 3 and from the hydraulic circuit 2. Further in mode 1, the control unit opens the isolation valves 12*a-b*, 13*a-b* to close the hydraulic circuit 2. Further in mode 1, the bypass valve 22 remains in the neutral (that is, closed) position. Further in mode 1, the valve 23 remains in the neutral (that is, closed) position, thereby fluidly disconnecting the working assembly 3 from the hydraulic circuit 2. Further in mode 1, the control unit controls the engine 9 to drive the pump 5 to displace hydraulic fluid from the hydraulic circuit 2 to the high pressure accumulator 4*a*, thereby pressurizing the high pressure accumulator 4*a*. In mode 1, hydraulic fluid is provided to the hydraulic circuit 2 by the above mentioned closed-circuit replenishing pump (not shown). The replenishing pump is normally intended to lubricate the hydrostatic components and may provide only a limited flow of fluid. Therefore, charging the high pressure accumulator 4*a* by operating the system 1 in mode 1 is typically a slow operation.

In mode 1, a hydraulic pressure in the first main fluid line 7 and in the fluid line connecting the first main fluid line 7 to the high pressure accumulator 4*a* may be at a high traction pressure of between 420 bar and 450 bar, while a hydraulic pressure in the second main fluid line 8 may be at a low traction pressure of between 20 bar and 30 bar, for example. In mode 1, the working assembly 3 may be operated in the standard work function mode.

Figure 3:
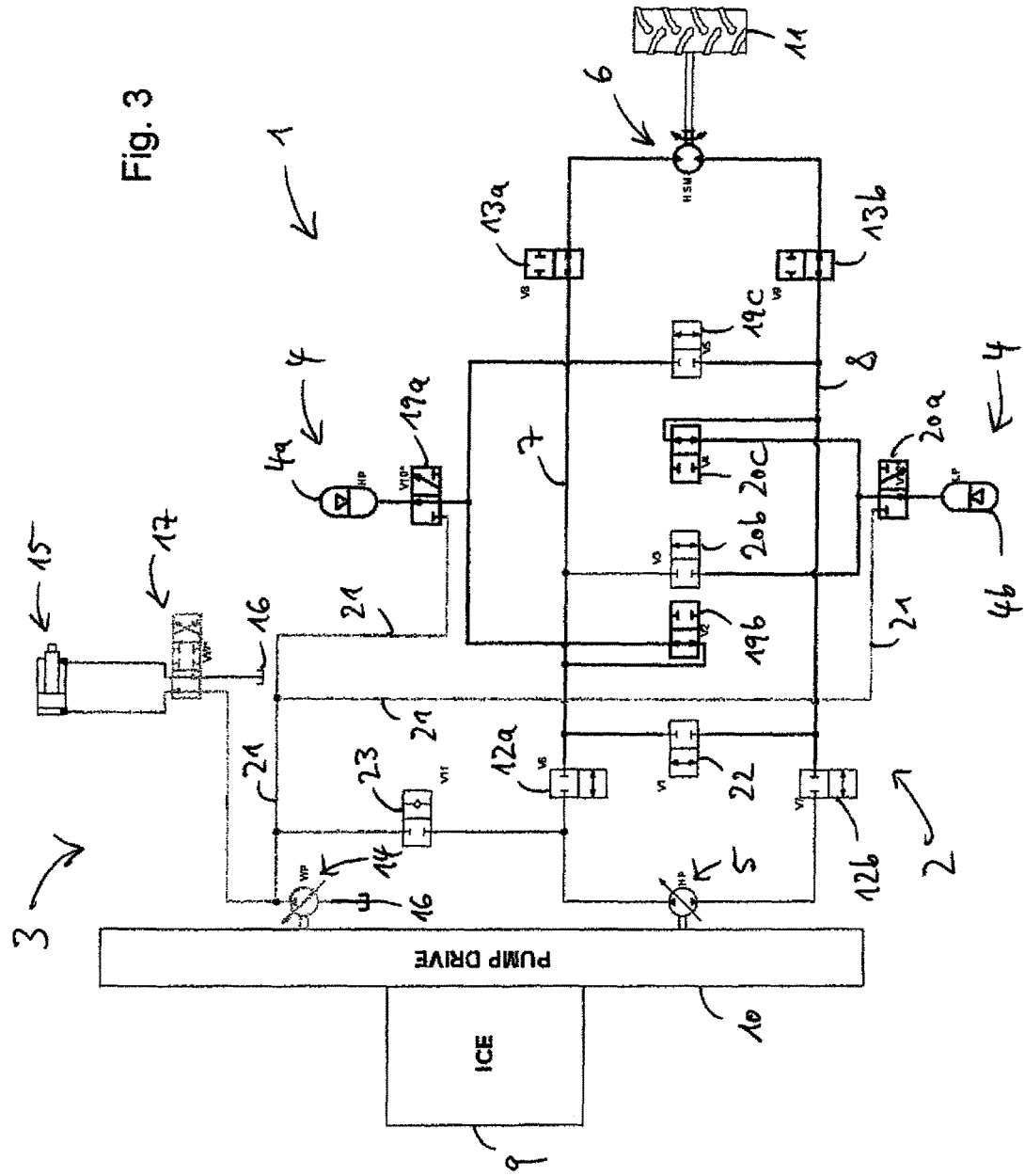
FIG. 3 shows the series hybrid system of FIG. 1, wherein hydraulic energy stored in the accumulator assembly is used to power a hydrostatic motor drivingly engaged with a vehicle output (mode 2)

FIG. 3 shows the series hydraulic hybrid system 1 of FIG. 1 in another mode of operation (mode 2). Mode 2 relates to using hydraulic energy stored in the accumulator assembly 4 to drive the motor 6.

In mode 2, the control unit (not shown) controls the high pressure accumulator valves 19*a-c* to fluidly disconnect the high pressure accumulator 4*a* from the working assembly 3, to fluidly connect the high pressure accumulator 4*a* to the first main fluid line 7, and to fluidly disconnect the high pressure accumulator 4*a* from the second main fluid line 8.

Further in mode 2, the control unit controls the low pressure accumulator valves 20*a-c* to fluidly disconnect the low pressure accumulator 4*b* from the working assembly 3, to fluidly connect the low pressure accumulator 4*b* to the second main fluid line 8, and to fluidly disconnect the low pressure accumulator 4*b* from the first main fluid line 7. Further in mode 2, the control unit closes the isolation valves 12*a-b* to fluidly disconnect the pump 5 from the accumulator assembly 4 and from the motor 6 and opens the isolation valves 13*a-b* to provide fluid connection between the accumulator assembly 4 and the motor 6. In mode 2, the valves 22, 23 remain in their neutral (closed) position.

Thus, in mode 2, hydraulic fluid may be displaced from the high pressure accumulator 4*a* to the low pressure accumulator 4*b* through the motor 6, thereby driving the motor 6 and the vehicle output 11 drivingly engaged with the motor 6. This may allow fuel saving and power boosting (providing additional power to the motor 6).

When operating the system 1 in mode 2, a hydraulic pressure in the first main fluid line 7 and in the fluid lines fluidly connecting the first main fluid line 7 to the high pressure accumulator 4*a* may be at a high traction pressure of between 420 bar and 450 bar, while a hydraulic pressure in the second main fluid line 8 and in the fluid lines connecting the second main fluid line 8 to the low pressure accumulator 4*b* may be at a low traction pressure of between 20 bar and 30 bar, for example. It is understood that, depending on a direction of movement of the vehicle, the fluid connection of the accumulators 4*a*, 4*b* to the main lines 7, 8 could be exchanged in mode 2 as is readily apparent to a person of ordinary skill.

Figure 4:
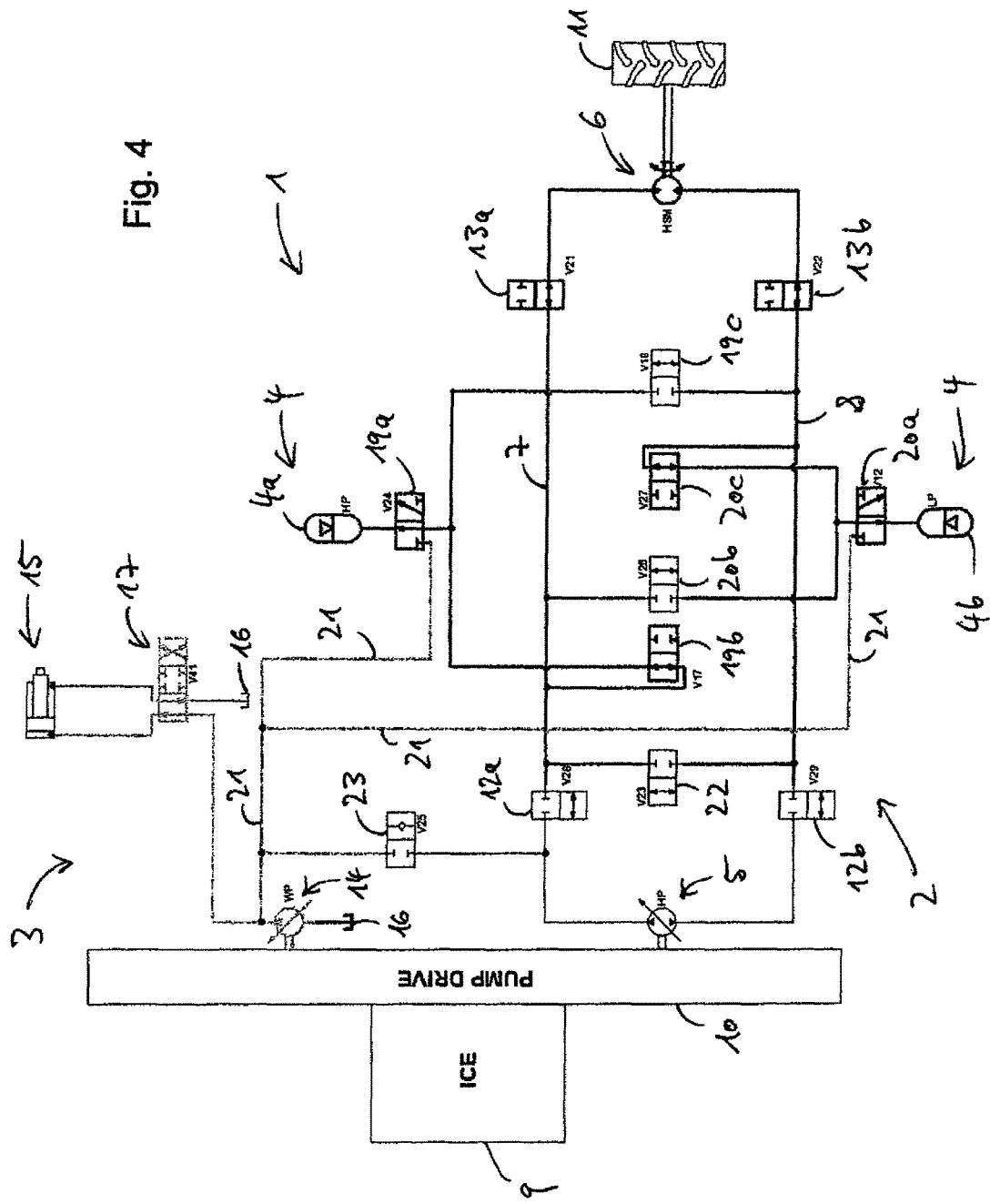
FIG. 4 shows the series hybrid system of FIG. 1, wherein the accumulator is charged through regenerative braking (mode 3)

FIG. 4 shows the series hydraulic hybrid system of FIG. 1 in another mode of operation (mode 3). Mode 3 relates to regenerative braking.

In mode 3, the control unit (not shown) controls the valves 12*a-b*, 13*a-b*, 22, 23, 19*a-c*, 20*a-c* as explained with respect to mode 2 and FIG. 3 above.

When the system 1 is operated in mode 3, the motor 6 may absorb kinetic energy from the vehicle output 11 to displace hydraulic fluid from the low pressure accumulator 4*b* to the high pressure accumulator 4*a*, thereby increasing a pressure gradient between the accumulators 4*a*, 4*b*. It is understood that, depending on a direction of movement of the vehicle, the fluid connection of the accumulators 4*a*, 4*b* to the main lines 7, 8 could be exchanged in mode 3 as is readily apparent to a person of ordinary skill.

FIG. 5 shows the series hydraulic hybrid system 1 of FIG. 1 in another mode of operation (mode 4). Mode 4 relates to pressurizing the high pressure accumulator 4*a* through the working pump 14.

In mode 4, the control unit (not shown) switches the high pressure accumulator valve 19*a* to the second control position, thereby fluidly connecting the high pressure accumulator 4*a* to the working assembly 3 and fluidly disconnecting the high pressure accumulator 4*a* from the hydraulic circuit 2. Specifically, the high pressure accumulator 4*a* is fluidly connected to the first fluid port 14*a* of the working pump 14 through the fluid line 21. Further in mode 4, the control unit controls the low pressure accumulator valves 20*a-c* to fluidly disconnect the low pressure accumulator 4*b* from the working assembly 3 and from the hydraulic circuit 2. The valve 23 remains in its neutral (closed) position.

Further in mode 4, the control unit controls the engine 9 and the splitter box 10 to drive the working pump 14 so that the working pump 14 displaces hydraulic fluid from the reservoir 16 to the high pressure accumulator 4*a*, thereby pressurizing the high pressure accumulator 4*a*. In mode 4, the working pump 14 can be driven to pressurize and fill the high pressure accumulator 4a up to a maximum hydraulic pressure of the working pump 14, for example up to a pressure of between 280 bar and 300 bar. In mode 4, the hydraulic circuit 2 may be operated in the standard hydrostatic mode.

Figure 6:
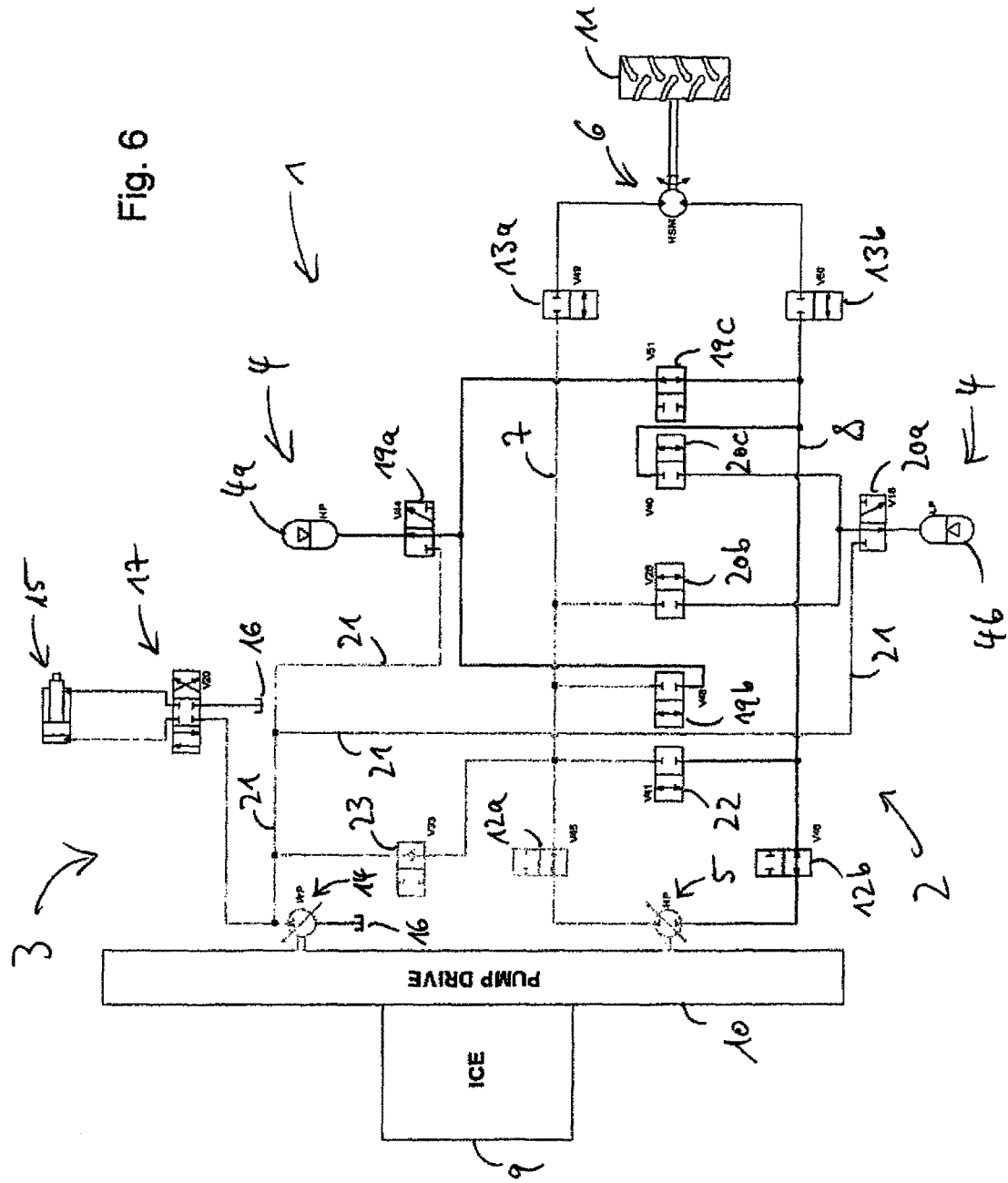
FIG. 6 shows the series hybrid system of FIG. 1, wherein the engine drives the hydrostatic pump to displace hydraulic fluid from a working hydraulic assembly through the hydraulic circuit and to the high pressure accumulator for pressurizing the high pressure accumulator (mode 5)

FIG. 6 shows the series hydraulic hybrid system 1 of FIG. 1 in another mode of operation (mode 5). Mode 5 relates to using hydraulic fluid from the working assembly 3 to charge the high pressure accumulator 4a to a hydraulic pressure above the maximum pressure of the working pump 14. This may only be achieved by using the hydrostatic pump 5 of the hydraulic circuit 2.

In detail, in mode 5 the control unit (not shown) controls the high pressure accumulator valves 19a-c to fluidly disconnect the high pressure accumulator 4a from the working assembly 3, to fluidly connect the high pressure accumulator 4a to the second main fluid line 8, and to fluidly disconnect the high pressure accumulator 4a from the first main fluid line 7. Further in mode 5, the control unit controls the low pressure accumulator valves 20a-c to fluidly disconnect the low pressure accumulator 4b from the working assembly 3 and from the hydraulic circuit 2.

Further in mode 5, the control unit closes the isolation valves 13a-b to fluidly disconnect the motor 6 from the accumulator assembly 4 and from the pump 5. Further in mode 5, the control unit actuates the valve 23 to fluidly connect the working assembly 3 to the hydraulic circuit 2. Specifically, the valve 23 fluidly connects the first fluid port 14a of the working pump 14 to the first main fluid line 7. Further in mode 5, the control unit opens the isolation valves 12a-b. The bypass valve 22 remains in its neutral (closed) position. Still in mode 5, the control unit controls the engine 9 to drive the working pump 14 and the hydrostatic pump 5. The working pump 14 then displaces hydraulic fluid from the reservoir 16 through the valve 23 to the first main fluid line 7 of the hydraulic circuit 2. The hydrostatic pump 5 of the hydraulic circuit 2 then displaces the hydraulic fluid provided to the first main fluid line 7 by the working pump 14 to the high pressure accumulator 4a through the second main fluid line 8. In this way, hydraulic fluid from the working assembly 3 may be used to charge the high pressure accumulator 4a up to its maximum pressure.

When operating the system 1 in mode 5, a hydraulic pressure in the working assembly 3, in the first main fluid line 7, and in the fluid lines fluidly connecting the working assembly 3 to the first main fluid line 7 may be at a work function pressure of between 250 bar and 270 bar, for example. A hydraulic pressure in the second main fluid line 8 and in the fluid lines fluidly connecting the second main fluid line 8 to the high pressure accumulator 4a may be at a high traction pressure of between 420 bar and 450 bar, for example.

In FIG. 7 the series hydraulic hybrid drive line 1 of FIG. 1 is operated in another mode of operation (mode 6). Mode 6 relates to using hydraulic fluid from the working assembly 3 to pressurize the low pressure accumulator 4b.

In mode 6 the control unit switches the low pressure accumulator valve 20a to the second control position, thereby fluidly connecting the low pressure accumulator 4b to the working assembly 3 and fluidly disconnecting the low pressure accumulator 4b from the hydraulic circuit 2. Further in mode 6, the control unit (not shown) controls the high pressure accumulator valves 19a-c to fluidly disconnect the high pressure accumulator 4a from the working assembly 3 and from the hydraulic circuit 2. The valve 23 remains in its neutral (closed) position. Further in mode 6, the control unit controls the engine 9 to drive the working pump 14 so that the working pump 14 displaces hydraulic fluid from the reservoir 16 to the low pressure accumulator 4b through the fluid line 21. The working pump 14 can be driven to pressurize and fill the low pressure accumulator 4b up to its maximum pressure, for example up to a pressure of about 100 bar. In mode 6 the hydraulic circuit 2 may be operated in the standard hydrostatic mode.

Figure 8:
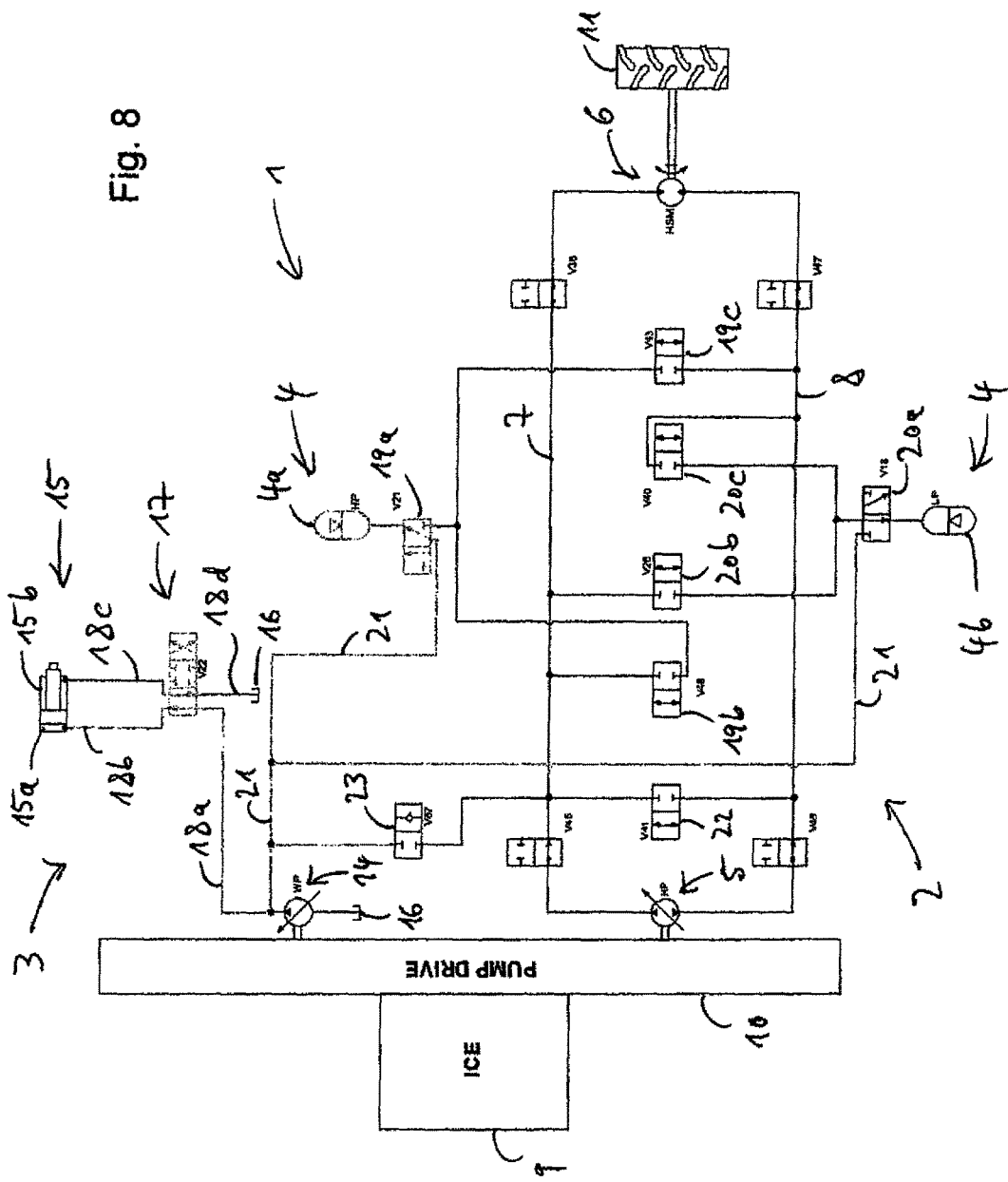
FIG. 8 shows the series hybrid system of FIG. 1, wherein hydraulic fluid is displaced from the high pressure accumulator to the hydraulic implement for driving the hydraulic implement (mode 7)

FIG. 8 shows the series hydraulic hybrid system 1 of FIG. 1 in another mode of operation (mode 7). Mode 7 relates to using hydraulic energy stored in the high pressure accumulator 4a to drive the hydraulic implement 15 of the working assembly 3.

Specifically, in mode 7 the control unit (not shown) switches the high pressure accumulator valve 19a to the second control position, thereby fluidly connecting the high pressure accumulator 4a to the working assembly 3 and fluidly disconnecting the high pressure accumulator 4a from the hydraulic circuit 2.

Further in mode 7, the control unit switches the 4/3-way control valve 17 of the working assembly 3 to its second control position (as shown in FIG. 8) or, alternatively, to its third control position. In FIG. 8, the high pressure accumulator 4a is fluidly connected to a fluid chamber formed on the first side 15a of the piston of the implement 15 through the fluid lines 21, 18a, the valve 17, and the fluid line 18b. At the same time, a fluid chamber formed on the second side 15b of the piston of the hydraulic implement 15 is fluidly connected to the low pressure reservoir 16 through the fluid line 18c, the control valve 17, and the fluid line 18d.

In this configuration, hydraulic fluid from the high pressure accumulator 4a may be displaced to the first side 15a of the piston of the implement 15, thereby driving the hydraulic piston of the implement 15 to the right in FIG. 8. Due to this movement of the piston, hydraulic fluid on the second side 15b of piston of the implement 15 is displaced to the low pressure reservoir 16. In mode 7 the hydraulic circuit 2 may be operated in the standard hydrostatic mode.

Figure 9:
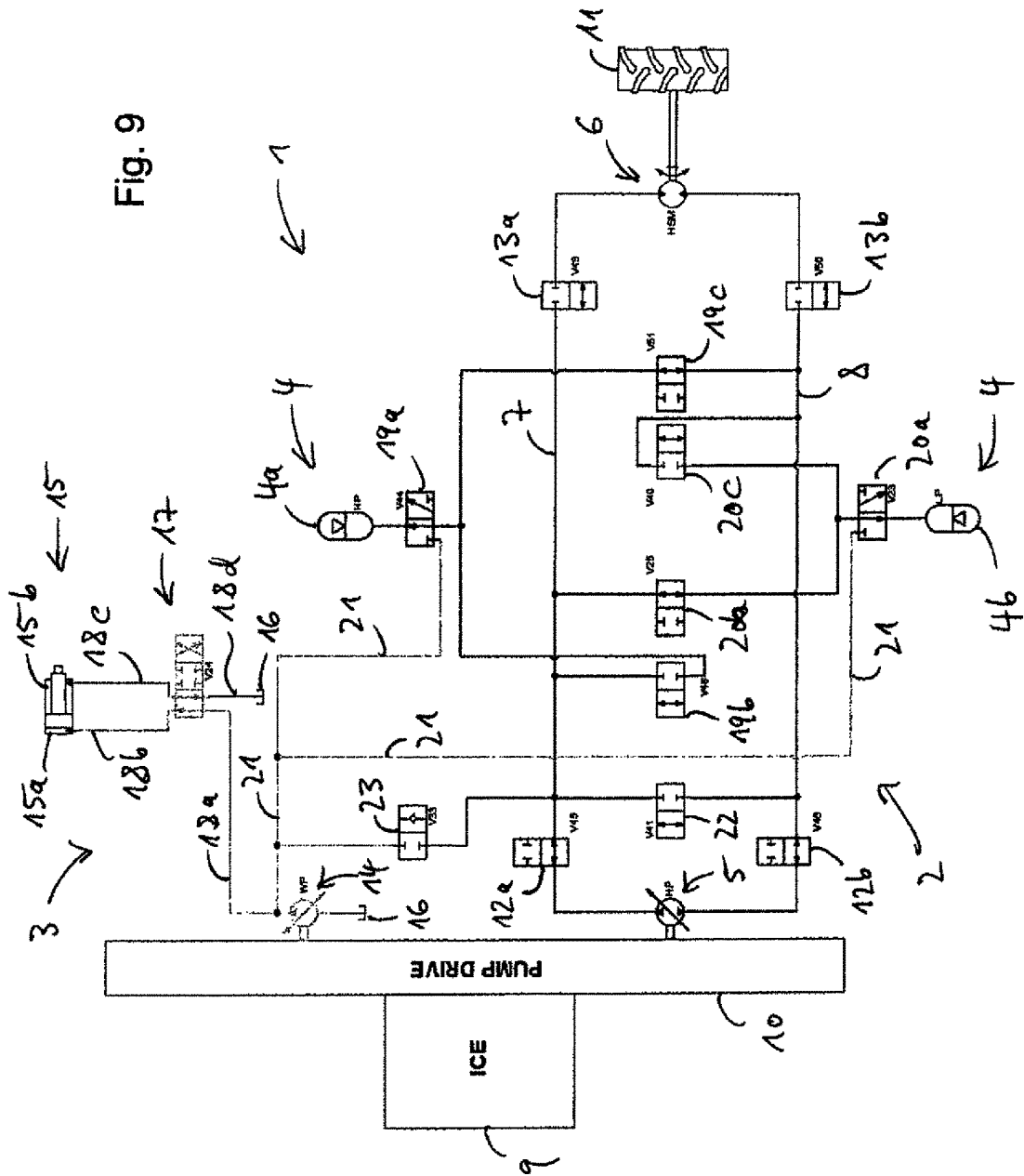
FIG. 9 shows the series hybrid system of FIG. 1, wherein hydraulic energy stored in the accumulator assembly is used to drive the working pump through the hydrostatic pump, the working pump and the hydrostatic pump being drivingly engaged through a splitter box (mode 8)

FIG. 9 shows the series hydraulic hybrid system 1 of FIG. 1 in another mode of operation (mode 8). Mode 8 relates to using hydraulic energy stored in the high pressure accumulator 4a to drive a working pump 14 through the hydrostatic pump 5 and the mechanical splitter box 10.

Specifically, in mode 8 the control unit (not shown) controls the high pressure accumulator valves 19a-c to fluidly disconnect the high pressure accumulator 4a from the working assembly 3, to fluidly connect the high pressure accumulator 4a to the second main fluid line 8, and to fluidly disconnect the high pressure accumulator 4a from the first main fluid line 7. Further in mode 8, the control unit controls the low pressure accumulator valves 20a-c to fluidly disconnect the low pressure accumulator 4b from the working assembly 3, to fluidly connect the low pressure accumulator 4b to the first main fluid line 7, and to fluidly disconnect the low pressure accumulator 4b from the second main fluid line 8.

Further in mode 8, the control unit closes the isolation valves 13a-b to fluidly disconnect the motor 6 from the accumulator assembly 4 and from the pump 5. Further in mode 8, the control unit opens the isolation valves 12a-b to fluidly connect the pump 5 to the accumulator assembly 4. The bypass valve 22 and the valve 23 both remain in their neutral (closed) position. Further in mode 8, the control unit controls the mechanical splitter box 10 to drivingly engage the pump 5 of the hydraulic circuit 2 with the working pump 14 of the working assembly 3, and to disengage the engine 9 from the pump 5 and from the working pump 14. The control unit further switches the control valve 17 to the second control position, just like in mode 7 (see FIG. 8).

In this configuration, hydraulic fluid stored in the high pressure accumulator 4a may be displaced from the high pressure accumulator 4a to the low pressure accumulator 4b through the hydrostatic pump 5, thereby driving the hydrostatic pump 5. The pump 5, which is drivingly engaged with the working pump 14 through the mechanical splitter box 10, then drives the working pump 14 so that the working pump 14 displaces hydraulic fluid from the reservoir 16 to the implement 15 to drive the hydraulic implement 15, as explained with regard to mode 7 above (see FIG. 8).

Operating the system 1 in mode 8 allows using hydraulic energy stored in the high pressure accumulator 4a to drive the implement 15 even when the hydraulic pressure in the high pressure accumulator 4a is above a maximum tolerable pressure of the working assembly 3.

When the system 1 is operated in mode 8, a hydraulic pressure in the second main fluid line 8 and in the fluid lines which fluid connect the second main fluid line 8 to the high pressure accumulator 4a may be at a high traction pressure of between 420 bar and 450 bar, for example. In mode 8, a hydraulic pressure in the first main fluid line 7 and in the fluid lines fluidly connecting the first main fluid line 7 to the low pressure accumulator 4b may be at a low traction pressure of between 20 bar and 30 bar, for example. A hydraulic pressure in the working assembly 3 may be at a work function pressure of between 250 bar and 270 bar, for example.

Figure 10:
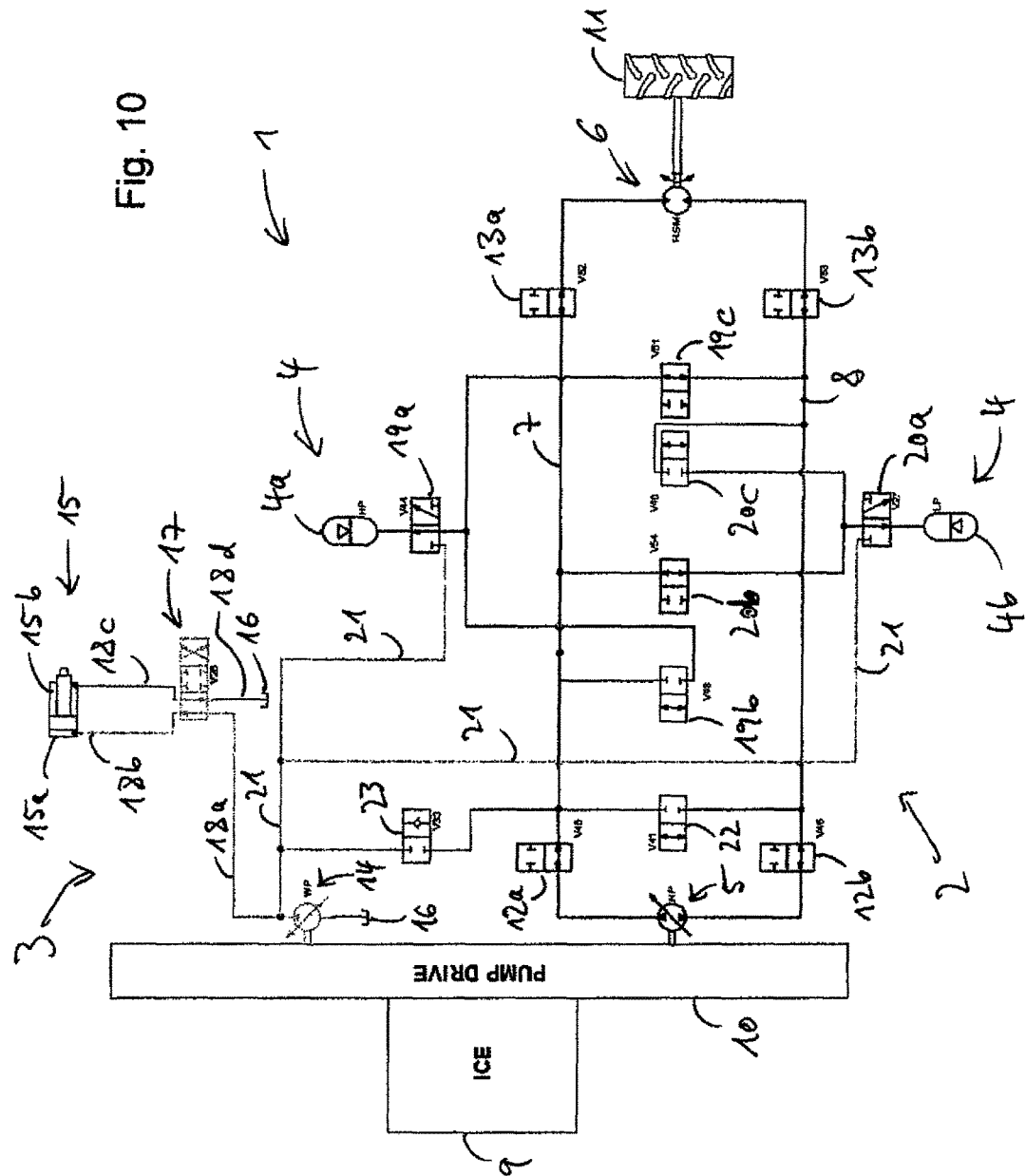
FIG. 10 shows the series hybrid system of FIG. 1, wherein hydraulic energy stored in the accumulator assembly is used to drive the hydrostatic motor and the hydrostatic pump (mode 9)

FIG. 10 shows the series hydraulic hybrid system 1 of FIG. 1 in another mode of operation (mode 9). Mode 9 relates to using hydraulic energy stored in the accumulator assembly 4 to drive both the hydrostatic pump 5 and the hydrostatic motor 6 simultaneously. The pump 5 and the motor 6 may then drive the working pump 14 and the vehicle output 11, respectively.

Specifically, in mode 9 the control unit controls the high pressure accumulator valves 19a-c to fluidly disconnect the high pressure accumulator 4a from the working assembly 3, to fluidly connect the high pressure accumulator 4a to the second main fluid line 8, and to fluidly disconnect the high pressure accumulator 4a from the first main fluid line 7. Further in mode 9, the control unit controls the low pressure accumulator valves 20a-c to fluidly disconnect the low pressure accumulator from the working assembly 3, to fluidly connect the low pressure accumulator 4b to the first main fluid line 7, and to fluidly disconnect the low pressure accumulator 4b from the second main fluid line 8. Further in mode 9, the control unit opens the isolation valves 12a-b, 13a-b to close the hydraulic circuit 2 and switches the valve 23 to the second control position. The bypass valve 22 remains in its neutral (closed) position.

Hydraulic fluid stored in the high pressure accumulator 4a may then be displaced to the low pressure accumulator 4b through the hydrostatic pump 5 and through the hydrostatic motor 6, thereby driving the hydrostatic pump 5 and the hydrostatic motor 6. The control unit may then further drivingly engage the pump 5 with the working pump 14 through the splitter box 10 so that the working pump 14 may displace hydraulic fluid from the reservoir 16 to the implement 15 for driving the implement 15, as explained with respect to modes 7 and 8 above.

In mode 9, a hydraulic pressure in the first main fluid line 7 and in the fluid lines fluidly connecting the first main fluid line 7 to the low pressure accumulator 4b may be at a low traction pressure of between 20 bar and 30 bar, for example.

A hydraulic pressure in the working assembly 3 may be at a work function pressure of between 250 bar and 270 bar, for example.

Figure 11:
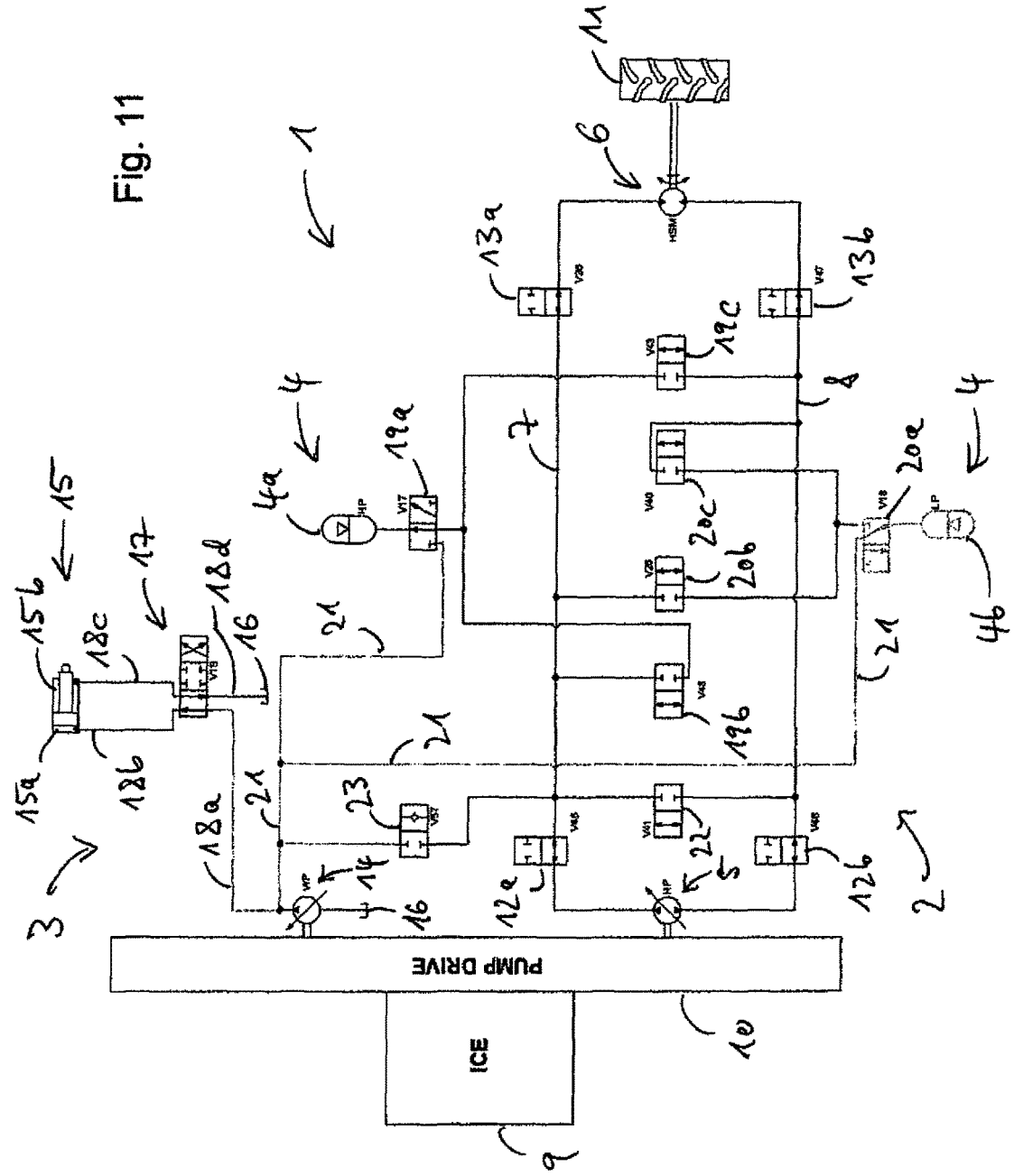
FIG. 11 shows the series hybrid system of FIG. 1, wherein hydraulic fluid is displaced from the low pressure accumulator to the hydraulic implement for driving the hydraulic implement (mode 10)

FIG. 11 shows the series hydraulic hybrid system 1 of FIG. 1 in another mode of operation (mode 10). Mode 10 relates to using hydraulic energy stored in the low pressure accumulator 4b to drive the hydraulic implement 15 of the working assembly 3.

In mode 10 the control unit (not shown) switches the low pressure accumulator valve 20a to the second control position, thereby fluidly connecting the low pressure accumulator 4b to the working assembly 3 through the fluid line 21. The control unit further switches the control valve 17 to the second control position (as shown in FIG. 11) or, alternatively, to the third control position. Further in mode 10, the control unit controls the high pressure accumulator valves 19a-c to fluidly disconnect the high pressure accumulator 4a from the hydraulic circuit 2 and from the working assembly 3. The valve 23 remains in its neutral (closed) position.

In the configuration shown in FIG. 11, hydraulic fluid from the low pressure accumulator 4b may be displaced to the first side 15a of the piston of the implement 15, thereby driving the hydraulic piston of the implement 15 to the right in FIG. 11. Due to this movement of the piston, hydraulic fluid on the second side 15b of the piston is displaced to the low pressure reservoir 16. Optionally, the control unit may simultaneously control the engine 9 to drive the working pump 14 to additionally displace hydraulic fluid from the reservoir 16 to the implement 15.

In mode 10, the hydraulic circuit 2 may be operated in the standard hydrostatic mode.

Figure 12:
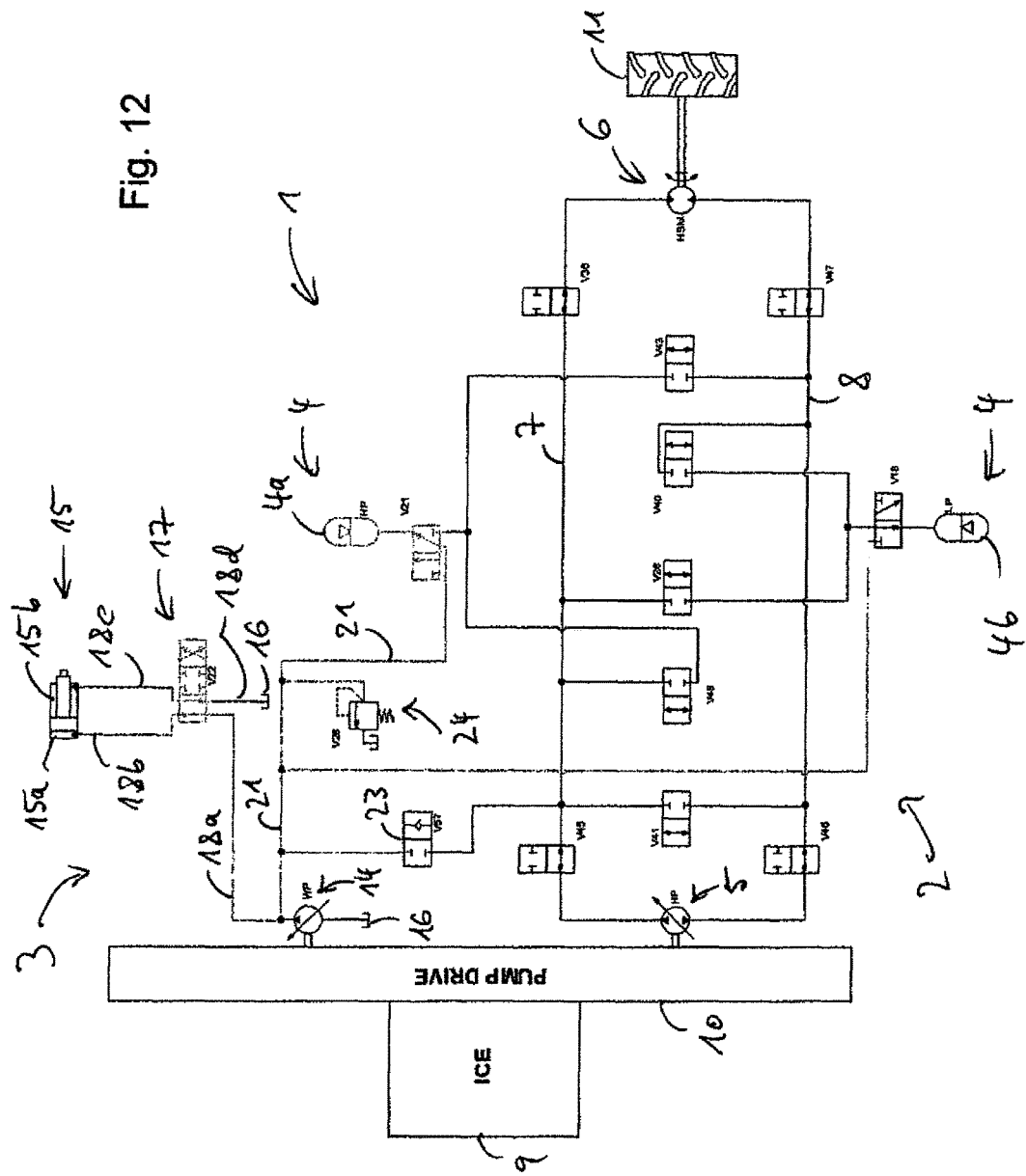
FIG. 12 shows the series hybrid system of FIG. 1, wherein hydraulic fluid is displaced from the high pressure accumulator through a pressure reducing valve to the hydraulic implement for driving the hydraulic implement (mode 11).

FIG. 12 shows the series hydraulic hybrid system 1 of FIG. 1 in another mode of operation (mode 11). Mode 11 is a variation of mode 7 depicted in FIG. 8 and relates to using hydraulic energy stored in the high pressure accumulator 4a to drive the hydraulic implement 15.

The configuration of mode 11 is identical to the configuration of mode 7 shown in FIG. 8, except for an additional pressure reducing valve 24 arranged between the high pressure accumulator 4a and the working assembly 3 and adapted to limit the hydraulic pressure provided by the high pressure accumulator 4a to the working assembly 3, in particular to the implement 15, to the maximum tolerable pressure of the working assembly 3. In this manner, hydraulic energy stored in the high pressure accumulator 4a may be used for driving the implement 15 irrespective of a pressure value of the hydraulic pressure in the high pressure accumulator 4a.

The following aspects of the invention are also noted, which the invention comprises.

A series hydraulic hybrid system (1) for a vehicle, comprising:
 a hydraulic circuit (2) comprising a first hydraulic displacement unit (5) in fluid communication with a second hydraulic displacement unit (6), the first hydraulic displacement unit (5) drivingly engaged or selectively drivingly engaged with a power source (9);
 a hydraulic working assembly (3) comprising a hydraulic implement (15) and a hydraulic working pump (14) in fluid communication with the hydraulic implement (15), the hydraulic working pump (14) drivingly engaged or selectively drivingly engaged with the power source (9); and
 a hydraulic accumulator assembly (4) comprising a high pressure hydraulic accumulator (4a) and a low pressure hydraulic accumulator (4b), the hydraulic accumulator assembly (4) selectively fluidly connected to the hydraulic circuit (2) and the hydraulic accumulator assembly (4) selectively fluidly connected to the hydraulic working assembly (3).

The series hydraulic hybrid system (1) as recited above, further comprising at least one high pressure accumulator valve (19a-c) and at least one low pressure accumulator valve (20a-c);

wherein the hydraulic circuit (2) comprises a first main fluid line (7) and a second main fluid line (8), the first main fluid line (7) fluidly connecting or selectively fluidly connecting a first fluid port (5a) of the first hydraulic displacement unit (5) to a first fluid port (6a) of the second hydraulic displacement unit (6), and the second main fluid line (8) fluidly connecting or selectively fluidly connecting a second fluid port (5b) of the first hydraulic displacement unit (5) to a second fluid port (6b) of the second hydraulic displacement unit (6);

wherein the at least one high pressure accumulator valve (19a-c) is adapted to selectively one of: fluidly disconnect the high pressure hydraulic accumulator (4a) from the hydraulic circuit (2), fluidly connect the high pressure hydraulic accumulator (4a) to the first main fluid line (7) while fluidly disconnecting the high pressure accumulator from the second main fluid line (8), and fluidly connect the high pressure hydraulic accumulator (4a) to the second main fluid line (8) while fluidly disconnecting the high pressure accumulator from the first main fluid line (7); and wherein the at least one low pressure accumulator valve (20a-c) is adapted to selectively one of: fluidly disconnect the low pressure hydraulic accumulator (4b) from the hydraulic circuit (2), fluidly connect the low pressure hydraulic accumulator (4b) to the first main fluid line (7) while fluidly disconnecting the low pressure accumulator from the second main fluid line (8), and fluidly connect the low pressure hydraulic accumulator (4b) to the second main fluid line (8) while fluidly disconnecting the low pressure accumulator from the second main fluid line (8).

The series hydraulic hybrid system (1) as recited above, wherein the high pressure hydraulic accumulator (4a) is selectively fluidly connected to the hydraulic working assembly (3), such that the hydraulic working pump (14) is adapted to selectively displace hydraulic fluid from the hydraulic working assembly (3) to the high pressure hydraulic accumulator (4a) for pressurizing the high pressure hydraulic accumulator (4a), and such that, when the high pressure hydraulic accumulator (4a) is charged, the high pressure hydraulic accumulator (4a) is adapted to selectively displace hydraulic fluid from the high pressure hydraulic accumulator (4a) to the hydraulic implement (15) for driving the hydraulic implement (15).

The series hydraulic hybrid system (1) as recited above, wherein the low pressure hydraulic accumulator (4b) is selectively fluidly connected to the hydraulic working assembly (3), such that the hydraulic working pump (14) is adapted to selectively displace hydraulic fluid from the hydraulic working assembly (3) to the low pressure hydraulic accumulator (4b) for pressurizing the low pressure hydraulic accumulator (4b), and such that, when the low pressure hydraulic accumulator (4b) is charged, the low pressure hydraulic accumulator (4b) is adapted to selectively displace hydraulic fluid from the low pressure hydraulic accumulator (4b) to the hydraulic implement (15) for driving the hydraulic implement (15).

The series hydraulic hybrid system (1) as recited above, wherein the hydraulic working assembly (3) is selectively fluidly connected to the hydraulic circuit (2), such that the hydraulic working pump (14) is adapted to selectively displace hydraulic fluid from the hydraulic working assembly (3) to the hydraulic circuit (2), and such that, when the high pressure hydraulic accumulator (4a) is charged, the high pressure hydraulic accumulator (4a) is adapted to selectively displace hydraulic fluid from the high pressure hydraulic accumulator (4a) through the hydraulic circuit (2) to the hydraulic implement (15) for driving the hydraulic implement (15).

The series hydraulic hybrid system (1) as recited above, further comprising a mechanical splitter box (10) adapted to selectively drivingly engage a transmission shaft of the first hydraulic displacement unit (5) with a transmission shaft of the hydraulic working pump (14), such that, when the hydraulic accumulator assembly (4) is charged, the hydraulic accumulator assembly (4) is adapted to selectively drive the hydraulic working pump (14) through the first hydraulic displacement unit (5) by displacing hydraulic fluid from the high pressure hydraulic accumulator (4a) to the low pressure hydraulic accumulator (4b) through the first hydraulic displacement unit (5).

The series hydraulic hybrid system (1) as recited above, wherein the hydraulic circuit (2) comprises a first pair of isolation valves (12a-b), the first pair of isolation valves (12a-b) adapted to selectively fluidly disconnect the first hydraulic displacement unit (5) from the second hydraulic displacement unit (6), and the first pair of isolation valves (12a-b) adapted to selectively fluidly disconnect the first hydraulic displacement unit (5) from the hydraulic accumulator assembly (4) when the hydraulic accumulator assembly (4) is fluidly connected to the hydraulic circuit (2).

The series hydraulic hybrid system (1) as recited above, wherein the hydraulic circuit (2) comprises a second pair of isolation valves (13a-b), the second pair of isolation valves (13a-b) adapted to selectively fluidly disconnect the second hydraulic displacement unit (6) from the first hydraulic displacement unit (5), and the second pair of isolation valves (13a-b) adapted to selectively fluidly disconnect the second hydraulic displacement unit (6) from the hydraulic accumulator assembly (4) when the hydraulic accumulator assembly (4) is fluidly connected to the hydraulic circuit (2).

The series hydraulic hybrid system (1) as recited above, wherein the hydraulic circuit (2) comprises a bypass valve (22), the bypass valve (22) adapted to selectively fluidly connect the first main fluid line (7) to the second main fluid line (8).

The series hydraulic hybrid system (1) as recited above, wherein the second hydraulic displacement unit (6) has a variable hydraulic displacement.

A method of operating the series hydraulic hybrid system (1) as recited above, the method comprising the steps of:
  fluidly connecting the high pressure hydraulic accumulator (4a) to the hydraulic working pump (14), and
  driving the hydraulic working pump (14) to displace hydraulic fluid from the hydraulic working assembly (3) to the high pressure hydraulic accumulator (4a) for pressurizing the high pressure hydraulic accumulator (4a);

or the method comprising the steps of:
  fluidly connecting the high pressure hydraulic accumulator (4a) to the hydraulic implement (15), and
  displacing hydraulic fluid from the high pressure hydraulic accumulator (4a) to the hydraulic implement (15) for driving the hydraulic implement (15).

A method of operating the series hydraulic hybrid system (1) as recited above, the method comprising the steps of:

fluidly connecting the low pressure hydraulic accumulator (4b) to the hydraulic working pump (14), and driving the hydraulic working pump (14) to displace hydraulic fluid from the hydraulic working assembly (3) to the low pressure hydraulic accumulator (4b) for pressurizing the low pressure hydraulic accumulator (4b);

or the method comprising the steps of:

fluidly connecting the low pressure hydraulic accumulator (4b) to the hydraulic implement (15), and displacing hydraulic fluid from the low pressure hydraulic accumulator (4b) to the hydraulic implement (15) for driving the hydraulic implement (15).

A method of operating the series hydraulic hybrid system (1) as recited above, the method comprising the steps of:

fluidly connecting the hydraulic working pump (14) to a first fluid port (5a) of the first hydraulic displacement unit (5);

fluidly connecting a second fluid port (5b) of the first hydraulic displacement unit (5) to the high pressure hydraulic accumulator (4a); and driving the working pump (14) and the first hydraulic displacement unit (5) to displace hydraulic fluid from the hydraulic working assembly (3) to the high pressure hydraulic accumulator (4a) for pressurizing the high pressure hydraulic accumulator (4a).

A method of operating the series hydraulic hybrid system (1) as recited above, the method comprising the steps of:

fluidly connecting the hydraulic accumulator assembly (4) to the first hydraulic displacement unit (5);

drivingly engaging the first hydraulic displacement unit (5) with the hydraulic working pump (14); and displacing hydraulic fluid from the high pressure hydraulic accumulator (4a) to the low pressure hydraulic accumulator (4b) through the first hydraulic displacement unit (5) to drive the hydraulic working pump (14) through the first hydraulic displacement unit (5).

The invention claimed is:

1. A series hydraulic hybrid system for a vehicle, comprising:
    a hydraulic circuit comprising a first hydraulic displacement unit in fluid communication with a second hydraulic displacement unit, the first hydraulic displacement unit drivingly engaged or selectively drivingly engaged with a power source, and the second hydraulic displacement unit drivingly engaged or selectively drivingly engaged with a vehicle output;
    a hydraulic working assembly comprising a hydraulic implement and a hydraulic working pump in fluid communication with the hydraulic implement, the hydraulic working pump drivingly engaged or selectively drivingly engaged with the power source; and
    a hydraulic accumulator assembly comprising a high pressure hydraulic accumulator and a low pressure hydraulic accumulator, the hydraulic accumulator assembly selectively fluidly connected to the hydraulic circuit and the hydraulic accumulator assembly selectively fluidly connected to the hydraulic working assembly;
    at least one high pressure accumulator valve for selectively fluidly connecting the high pressure accumulator to the hydraulic circuit;
    at least one low pressure accumulator valve for selectively fluidly connecting the low pressure accumulator to the hydraulic circuit; and
    an electronic control unit configured to control the at least one high pressure accumulator valve and the at least one low pressure accumulator valve through electromagnetic signals such that hydraulic fluid may be displaced from the high pressure accumulator to the low pressure accumulator through the second hydraulic displacement unit, thereby driving the second hydraulic displacement unit and the vehicle output drivingly engaged with the second hydraulic displacement unit.

2. The series hydraulic hybrid system of claim 1, wherein the hydraulic circuit comprises a first main fluid line and a second main fluid line, the first main fluid line fluidly connecting or selectively fluidly connecting a first fluid port of the first hydraulic displacement unit to a first fluid port of the second hydraulic displacement unit, and the second main fluid line fluidly connecting or selectively fluidly connecting a second fluid port of the first hydraulic displacement unit to a second fluid port of the second hydraulic displacement unit;

wherein the at least one high pressure accumulator valve is adapted to selectively one of: fluidly disconnect the high pressure hydraulic accumulator from the hydraulic circuit, fluidly connect the high pressure hydraulic accumulator to the first main fluid line while fluidly disconnecting the high pressure accumulator from the second main fluid line, and fluidly connect the high pressure hydraulic accumulator to the second main fluid line while fluidly disconnecting the high pressure accumulator from the first main fluid line; and wherein the at least one low pressure accumulator valve is adapted to selectively one of: fluidly disconnect the low pressure hydraulic accumulator from the hydraulic circuit, fluidly connect the low pressure hydraulic accumulator to the first main fluid line while fluidly disconnecting the low pressure accumulator from the second main fluid line, and fluidly connect the low pressure hydraulic accumulator to the second main fluid line while fluidly disconnecting the low pressure accumulator from the second main fluid line.

3. The series hydraulic hybrid system of claim 1, wherein the high pressure hydraulic accumulator is selectively fluidly connected to the hydraulic working assembly, such that the hydraulic working pump is adapted to selectively displace hydraulic fluid from the hydraulic working assembly to the high pressure hydraulic accumulator for pressurizing the high pressure hydraulic accumulator, and such that, when the high pressure hydraulic accumulator is charged, the high pressure hydraulic accumulator is adapted to selectively displace hydraulic fluid from the high pressure hydraulic accumulator to the hydraulic implement for driving the hydraulic implement.

4. The series hydraulic hybrid system of claim 1, wherein the low pressure hydraulic accumulator is selectively fluidly connected to the hydraulic working assembly, such that the hydraulic working pump is adapted to selectively displace hydraulic fluid from the hydraulic working assembly to the low pressure hydraulic accumulator for pressurizing the low pressure hydraulic accumulator, and such that, when the low pressure hydraulic accumulator is charged, the low pressure hydraulic accumulator is adapted to selectively displace hydraulic fluid from the low pressure hydraulic accumulator to the hydraulic implement for driving the hydraulic implement.

5. The series hydraulic hybrid system of claim 2, further comprising a mechanical splitter box adapted to selectively drivingly engage a transmission shaft of the first hydraulic displacement unit with a transmission shaft of the hydraulic working pump, such that, when the hydraulic accumulator assembly is charged, the hydraulic accumulator assembly is adapted to selectively drive the hydraulic working pump through the first hydraulic displacement unit by displacing hydraulic fluid from the high pressure hydraulic accumulator to the low pressure hydraulic accumulator through the first hydraulic displacement unit.

6. The series hydraulic hybrid system of claim 1, wherein the hydraulic circuit comprises a first pair of isolation valves adapted to selectively fluidly disconnect the first hydraulic displacement unit from the second hydraulic displacement unit, and the first pair of isolation valves adapted to selectively fluidly disconnect the first hydraulic displacement unit from the hydraulic accumulator assembly when the hydraulic accumulator assembly is fluidly connected to the hydraulic circuit.

7. The series hydraulic hybrid system of claim 6, wherein the hydraulic circuit comprises a second pair of isolation valves, the second pair of isolation valves adapted to selectively fluidly disconnect the second hydraulic displacement unit from the first hydraulic displacement unit, and the second pair of isolation valves adapted to selectively fluidly disconnect the second hydraulic displacement unit from the hydraulic accumulator assembly when the hydraulic accumulator assembly is fluidly connected to the hydraulic circuit.

8. The series hydraulic hybrid system of claim 2, wherein the hydraulic circuit comprises a bypass valve, the bypass valve adapted to selectively fluidly connect the first main fluid line to the second main fluid line.

9. The series hydraulic hybrid system of claim 1, wherein the second hydraulic displacement unit has a variable hydraulic displacement.

10. A method of operating a series hydraulic hybrid system, the method comprising the steps of:
a) providing the series hydraulic hybrid system comprising:
a hydraulic circuit comprising a first hydraulic displacement unit in fluid communication with a second hydraulic displacement unit, the first hydraulic displacement unit drivingly engaged or selectively drivingly engaged with a power source;
a hydraulic working assembly comprising a hydraulic implement and a hydraulic working pump in fluid communication with the hydraulic implement, the hydraulic working pump drivingly engaged or selectively drivingly engaged with the power source; and
a hydraulic accumulator assembly comprising a high pressure hydraulic accumulator and a low pressure hydraulic accumulator, the hydraulic accumulator assembly selectively fluidly connected to the hydraulic circuit and the hydraulic accumulator assembly selectively fluidly connected to the hydraulic working assembly, wherein the high pressure hydraulic accumulator is selectively fluidly connected to the hydraulic working assembly, such that the hydraulic working pump is adapted to selectively displace hydraulic fluid from the hydraulic working assembly to the high pressure hydraulic accumulator for pressurizing the high pressure hydraulic accumulator, and such that, when the high pressure hydraulic accumulator is charged, the high pressure hydraulic accumulator is adapted to selectively displace hydraulic fluid from the high pressure hydraulic accumulator to the hydraulic implement for driving the hydraulic implement; and
b) one of:
fluidly connecting the high pressure hydraulic accumulator to the hydraulic working pump, and driving the hydraulic working pump to displace hydraulic fluid from the hydraulic working assembly to the high pressure hydraulic accumulator for pressurizing the high pressure hydraulic accumulator; and
fluidly connecting the high pressure hydraulic accumulator to the hydraulic implement, and displacing hydraulic fluid from the high pressure hydraulic accumulator to the hydraulic implement for driving the hydraulic implement.

11. A method of operating a series hydraulic hybrid system, the method comprising the steps of:
a) providing the series hydraulic hybrid system comprising:
a hydraulic circuit comprising a first hydraulic displacement unit in fluid communication with a second hydraulic displacement unit, the first hydraulic displacement unit drivingly engaged or selectively drivingly engaged with a power source;
a hydraulic working assembly comprising a hydraulic implement and a hydraulic working pump in fluid communication with the hydraulic implement, the hydraulic working pump drivingly engaged or selectively drivingly engaged with the power source; and
a hydraulic accumulator assembly comprising a high pressure hydraulic accumulator and a low pressure hydraulic accumulator, the hydraulic accumulator assembly selectively fluidly connected to the hydraulic circuit and the hydraulic accumulator assembly selectively fluidly connected to the hydraulic working assembly, wherein the low pressure hydraulic accumulator is selectively fluidly connected to the hydraulic working assembly, such that the hydraulic working pump is adapted to selectively displace hydraulic fluid from the hydraulic working assembly to the low pressure hydraulic accumulator for pressurizing the low pressure hydraulic accumulator, and such that, when the low pressure hydraulic accumulator is charged, the low pressure hydraulic accumulator is adapted to selectively displace hydraulic fluid from the low pressure hydraulic accumulator to the hydraulic implement for driving the hydraulic implement; and
b) one of:
fluidly connecting the low pressure hydraulic accumulator to the hydraulic working pump, and driving the hydraulic working pump to displace hydraulic fluid from the hydraulic working assembly to the low pressure hydraulic accumulator for pressurizing the low pressure hydraulic accumulator; and
fluidly connecting the low pressure hydraulic accumulator to the hydraulic implement, and displacing hydraulic fluid from the low pressure hydraulic accumulator to the hydraulic implement for driving the hydraulic implement.

* * * * *